US012208621B2

(12) United States Patent
Yamada et al.

(10) Patent No.: US 12,208,621 B2
(45) Date of Patent: Jan. 28, 2025

(54) LIQUID DISCHARGE APPARATUS, WASTE LIQUID COLLECTING UNIT, AND WASTE LIQUID COLLECTING METHOD

(71) Applicant: SEIKO EPSON CORPORATION, Tokyo (JP)

(72) Inventors: Katsumi Yamada, Matsumoto (JP); Takatoshi Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/336,536

(22) Filed: Jun. 16, 2023

(65) Prior Publication Data

US 2023/0321986 A1 Oct. 12, 2023

Related U.S. Application Data

(63) Continuation of application No. 17/452,253, filed on Oct. 26, 2021, now Pat. No. 11,964,490.

(30) Foreign Application Priority Data

Oct. 29, 2020 (JP) ................................. 2020-181062
Mar. 23, 2021 (JP) ................................. 2021-048950

(51) Int. Cl.
*B41J 2/17* (2006.01)
*B41J 2/165* (2006.01)

(52) U.S. Cl.
CPC ......... *B41J 2/1721* (2013.01); *B41J 2/16523* (2013.01)

(58) Field of Classification Search
None
See application file for complete search history.

(56) References Cited

U.S. PATENT DOCUMENTS 7,011,389 B2 3/2006 Edamura et al.
7,768,798 B2 8/2010 Aono et al.
8,910,587 B2 12/2014 Sakura et al.
8,944,554 B2 * 2/2015 Kondo ................ B41J 2/16523 347/14
11,192,374 B2 12/2021 Tanaka
(Continued)

FOREIGN PATENT DOCUMENTS

CN 102029786 4/2011
JP 2004-106375 4/2004
(Continued)

*Primary Examiner* — Alejandro Valencia
(74) *Attorney, Agent, or Firm* — WORKMAN NYDEGGER

(57) ABSTRACT

A recording apparatus includes a discard absorbing member (first absorbing member) that absorbs a liquid discarded from a discharge head to an outer side of an end portion of a medium supported by a support section as a waste liquid. Further, the recording apparatus includes: a cap which is an example of a waste liquid receiving section that receives the liquid ejected from the discharge head as a waste liquid; a waste liquid absorbing member (second absorbing member) that absorbs the waste liquid sent from the cap; and a waste liquid box (accommodating section) that holds the waste liquid absorbing member. The discard absorbing member and the waste liquid absorbing member 50A are coupled to each other such that the waste liquid can be delivered from the discard absorbing member to the waste liquid absorbing member.

15 Claims, 21 Drawing Sheets

(56) References Cited

U.S. PATENT DOCUMENTS

| | | | |
|---|---|---|---|
| 11,840,087 B2 | 12/2023 | Tanaka | |
| 2009/0256884 A1* | 10/2009 | Aoki | B41J 2/1721 347/23 |
| 2011/0074872 A1 | 3/2011 | Ozaki et al. | |
| 2016/0288505 A1 | 10/2016 | Tsukuda et al. | |
| 2016/0347093 A1 | 12/2016 | Ogasawara et al. | |
| 2017/0368830 A1 | 12/2017 | Nakagawa et al. | |
| 2020/0039248 A1* | 2/2020 | Suzuki | B41J 11/46 |
| 2020/0316946 A1* | 10/2020 | Tanaka | B41J 2/16523 |
| 2022/0063280 A1 | 3/2022 | Tanaka | |

FOREIGN PATENT DOCUMENTS

| | | |
|---|---|---|
| JP | 2010-131799 | 6/2010 |
| JP | 2014-094576 A | 5/2014 |
| JP | 2016-221942 | 12/2016 |
| JP | 2017-226191 | 12/2017 |
| JP | 2019-119136 | 7/2019 |
| JP | 2020-019575 | 2/2020 |
| JP | 2020-168789 | 10/2020 |

* cited by examiner

LIQUID DISCHARGE APPARATUS, WASTE LIQUID COLLECTING UNIT, AND WASTE LIQUID COLLECTING METHOD

This application is a continuation of U.S. patent application Ser. No. 17/452,253, filed Oct. 26, 2021 which is based on, and claims priority from JP Application Serial Number 2020-181062, filed Oct. 29, 2020 and JP Application Serial Number 2021-048950, filed Mar. 23, 2021, the disclosures of which are hereby incorporated by reference herein in their entirety.

BACKGROUND

1. Technical Field

The present disclosure relates to a liquid discharge apparatus including a transport section that transports a medium, a support section that supports the medium, and a discharge head that performs recording on the medium supported by the support section; a waste liquid collecting unit; and a waste liquid collecting method.

2. Related Art

For example, JP-A-2019-119136 discloses a liquid discharge apparatus including a discharge head that discharges a liquid such as ink to a medium. This type of liquid discharge apparatus is provided with a maintenance device that forcibly ejects a liquid such as ink from a nozzle of the discharge head. The liquid discharge apparatus includes a waste liquid accommodating body that collects a waste liquid such as ink ejected from the discharge head by the maintenance device.

However, in the liquid discharge apparatus described in JP-A-2019-119136, although a unit that replaces the waste liquid absorber is illustrated, the waste liquid absorber remains on the main body side only by separating the tube from the bottom frame. When the user directly takes out and replaces the waste liquid absorber in this state, there is a problem that, not only is it difficult to work, but the waste liquid absorber filled with the waste liquid may contaminate the surrounding components.

SUMMARY

According to an aspect of the present disclosure, there is provided a liquid discharge apparatus including: a discharge head that discharges a liquid to a recording material; a support section provided facing the discharge head and supporting the recording material from below; a first absorbing member that absorbs the liquid discarded from the discharge head to an outer side of an end portion of the recording material supported by the support section, as a waste liquid; a waste liquid receiving section that receives the liquid ejected from the discharge head as a waste liquid; a second absorbing member that absorbs the waste liquid sent from the waste liquid receiving section; and an accommodating section that holds the second absorbing member, in which the first absorbing member and the second absorbing member are coupled to each other so as to deliver the waste liquid from the first absorbing member to the second absorbing member.

According to another aspect of the present disclosure, there is provided a waste liquid collecting unit which is inserted to be attachable to and detachable from an apparatus main body of a liquid discharge apparatus including a support section that supports a recording material, a discharge head that discharges a liquid to the recording material, a first absorbing member that absorbs the liquid discarded from the discharge head to an outer side of an end portion of the recording material supported by the support section, and a waste liquid receiving section that receives the liquid ejected from the discharge head as a waste liquid, the waste liquid collecting unit including: a second absorbing member that absorbs a waste liquid sent from the waste liquid receiving section; and an accommodating section that holds the second absorbing member, in which, in a state where the accommodating section is inserted into the apparatus main body, the second absorbing member is coupled so as to absorb the waste liquid from the waste liquid receiving section, and is coupled to the first absorbing member so as to deliver the waste liquid from the first absorbing member, and when the accommodating section is removed from the apparatus main body, coupling between the second absorbing member and the second absorbing member for absorbing the waste liquid from the waste liquid receiving section is released, and coupling between the second absorbing member and the first absorbing member is disconnected in a state where a path of the waste liquid delivered from the first absorbing member is blocked.

According to a still another aspect of the present disclosure, there is provided a waste liquid collecting method for collecting a waste liquid in a liquid discharge apparatus including a support section that supports a recording material, a discharge head that discharges a liquid to the recording material, a first absorbing member that absorbs the liquid discarded from the discharge head to an outer side of an end portion of the recording material supported by the support section, a second absorbing member that absorbs the waste liquid sent from a waste liquid receiving section that receives the liquid ejected from the discharge head as a waste liquid, and an accommodating section that holds the second absorbing member, the method including: providing the accommodating section to be attachable to and detachable from an apparatus main body; coupling the second absorbing member to a waste liquid flow path so as to absorb the waste liquid sent from the waste liquid receiving section, and coupling the second absorbing member to the first absorbing member so as to deliver the waste liquid from the first absorbing member, when the accommodating section is inserted into the apparatus main body; and releasing the coupling between the second absorbing member and the waste liquid flow path of the waste liquid receiving section, and disconnecting the coupling between the second absorbing member and the first absorbing member in a state where the delivery of the waste liquid from the first absorbing member is blocked, when the accommodating section is removed from the apparatus main body.

DESCRIPTION OF EXEMPLARY EMBODIMENTS

First Embodiment

Figure 1:
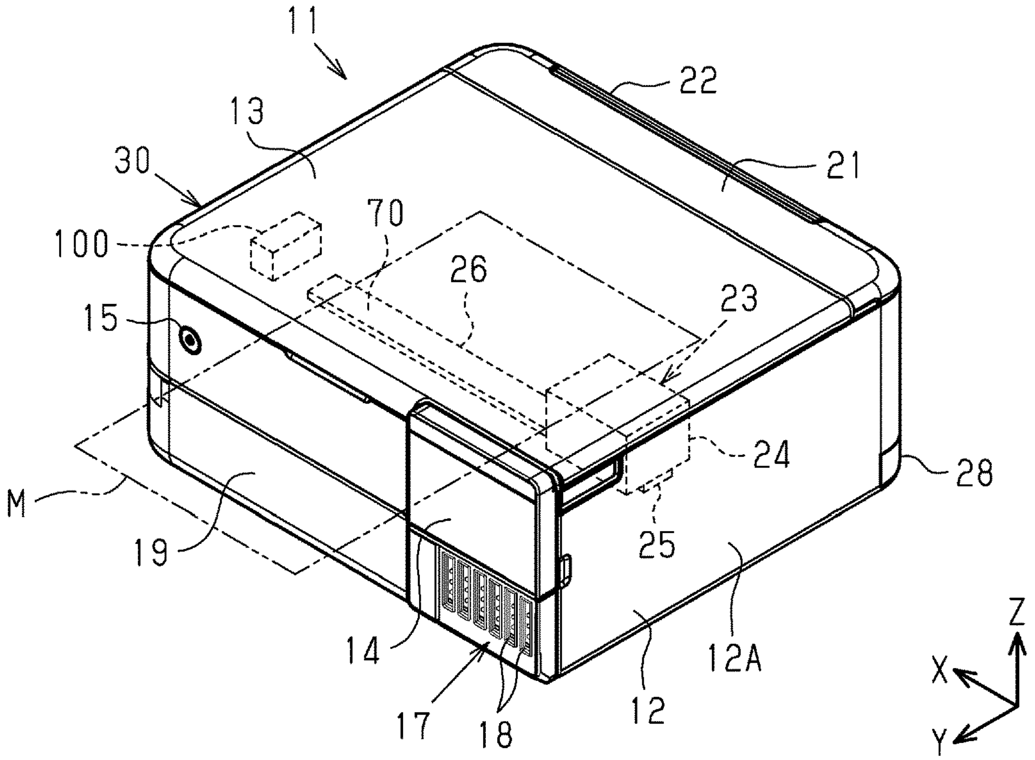
FIG. 1 is a perspective view of a recording apparatus according to a first embodiment.

Hereinafter, a first embodiment according to a recording apparatus 11 which is an example of a liquid discharge apparatus will be described with reference to the drawings. In FIG. 1, assuming that the recording apparatus 11 is mounted on a horizontal plane, three virtual axes orthogonal to each other are defined as an X axis, a Y axis, and a Z axis. The X axis is a virtual axis parallel to a scanning direction of a discharge head 25, which will be described later, and the Y axis is a virtual axis parallel to a transport direction of a medium at the time of recording. The Z axis is a virtual axis parallel to a vertical direction Z. Both directions parallel to the X axis indicate directions in which a recording section 23 including the discharge head 25 is reciprocally scanned. Therefore, the direction in which the recording section 23 is scanned is also referred to as "scanning direction X". One direction parallel to the Y axis indicates the transport direction of a medium M at a recording position where the discharge head 25 performs recording on the medium M. Therefore, the transport direction of the medium M at the recording position is also referred to as "transport direction Y". On the Y axis, the surface side of the recording apparatus 11 on which a display section 14 described later is disposed is referred to as front, and the side opposite to the front is referred to as rear. The transport path on which the medium M is transported is not parallel to the Y axis in the entire area, and the transport direction changes according to the position of the medium M on the transport path.

Configuration of Recording Apparatus

The recording apparatus 11 illustrated in FIG. 1 is a serial recording type ink jet printer. As illustrated in FIG. 1, the recording apparatus 11 includes an apparatus main body 12 and a cover 13 provided on the upper portion of the apparatus main body 12 so as to be openable and closable. The apparatus main body 12 includes a housing 12A that accommodates various mechanisms related to recording. The recording apparatus 11 has a substantially rectangular parallelepiped shape as a whole. The recording apparatus 11 of this example is a multifunction device provided with an image reading device 30 (scanner) on an upper portion of the apparatus main body 12. The cover 13 is opened and closed when a document is set in the image reading device 30. When the cover 13 is opened, a document holder 31 (refer to FIG. 7) having a glass plate on which the document is set in the image reading device 30 is exposed.

As illustrated in FIG. 1, the recording apparatus 11 includes the display section 14 on the front surface. The display section 14 is configured with, for example, a touch panel, and configures a part of an interface function operated by a user to give an instruction to the recording apparatus 11. The display section 14 is configured with, for example, a touch panel, and has an operation function operated when giving various instructions to the recording apparatus 11, and a display function of displaying various menus and operating statuses of the recording apparatus 11. The display section 14 is attached to the apparatus main body 12 to be turnable around a width direction X (left-right direction). A power button 15 is provided on the front surface of the apparatus main body 12. The recording apparatus 11 may include the display section 14 that does not have a touch panel function and a switch type operation section.

On the front right side of the apparatus main body 12, one or a plurality (six in this embodiment) of liquid supply sources 17 are provided. The liquid supply source 17 is configured with, for example, an ink tank or an ink cartridge. Each of the liquid supply sources 17 has one or a plurality of (six in this embodiment) corresponding transparent window sections 18. The window section 18 is made of transparent or translucent resin, and the user can visually recognize the liquid level of the liquid accommodated in the liquid supply source 17 through the window section 18 from the outside. In other words, the window section 18 configures a liquid remaining amount display section that displays a remaining liquid amount in the liquid supply source 17.

On the front surface of the recording apparatus 11, a cassette cover 19 is provided to be openable and closable. The cassette cover 19 is opened and closed by turning around a lower end. A cassette 20 (refer to FIGS. 6 and 8) is inserted to be attachable to and detachable from the apparatus main body 12 inside the cassette cover 19 at the closed position illustrated in FIG. 1. A plurality of media M are accommodated in the cassette 20. A first feeding section 41 (refer to FIG. 8) for feeding the medium M from the cassette 20 is provided in the apparatus main body 12. The medium M corresponds to an example of a recording material.

Figure 2:
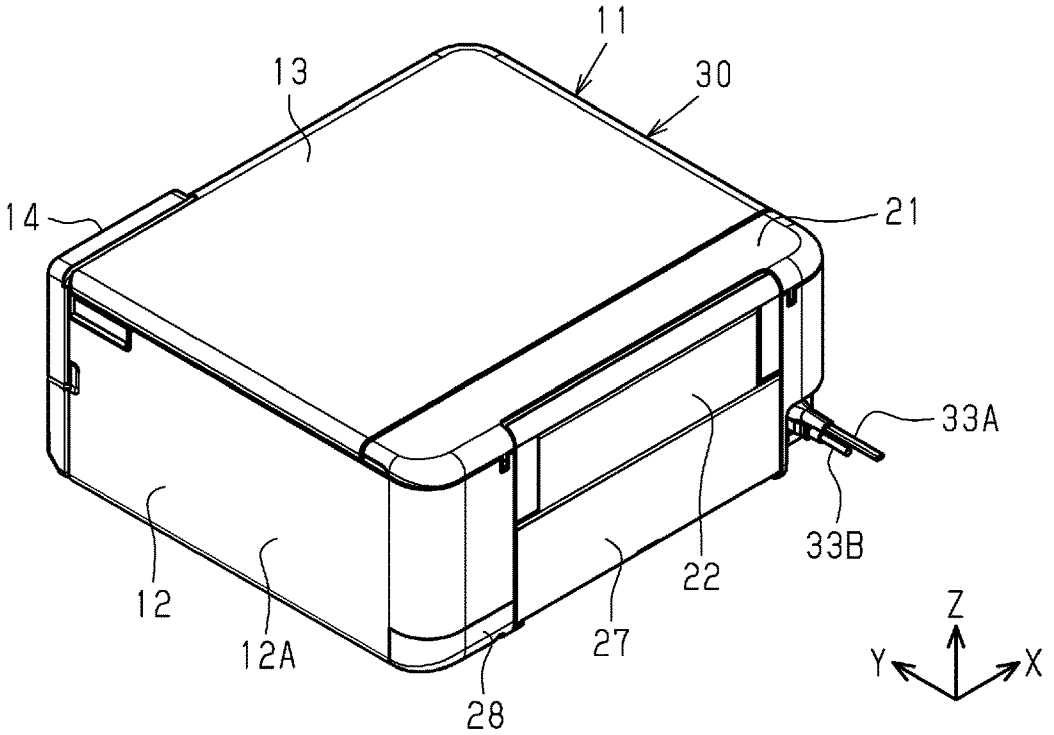
FIG. 2 is a rear perspective view illustrating the recording apparatus.

As illustrated in FIGS. 1 and 2, a feeding cover 21 is provided to be openable and closable on the rear portion of the upper surface of the recording apparatus 11. The feeding cover 21 is opened and closed by turning around the rear end. A feeding tray 22 stored at a storage position is disposed on the back surface portion of the apparatus main body 12. The feeding tray 22 is disposed at the use position in a rearward inclined oblique posture illustrated in FIGS. 3 and 4 by pulling the feeding tray 22 upward from the storage position illustrated in FIGS. 1 and 2.

As illustrated in FIG. 1, the recording section 23 for performing recording on the medium M fed from the cassette 20 or the feeding tray 22 (refer to FIG. 3) is accommodated in the apparatus main body 12. The recording section 23 is, for example, a serial recording type. The serial recording type recording section 23 includes a carriage 24 capable of reciprocating in the scanning direction X, and the discharge head 25 held at the lower portion of the carriage 24. In other words, the recording apparatus 11 includes the discharge head 25 that discharges a liquid to the medium M. The surface of the discharge head 25 facing the medium M transported along the transport path is a nozzle surface (refer to FIG. 6) on which a plurality of nozzles (not illustrated) are open. The liquid supply source 17 and the recording section 23 are coupled to each other through a liquid supply tube (not illustrated), and the liquid is supplied from the liquid supply source 17 to the discharge head 25 through the liquid supply tube.

As illustrated in FIG. 1, the recording apparatus 11 is provided facing the discharge head 25, and includes a support section 26 that supports the medium M from below. The support section 26 is a long member that extends in the width direction X over a region facing the moving path of the discharge head 25. The support section 26 supports the medium M transported by a transport section 40 (refer to FIG. 6). In the process of moving in the scanning direction X, the discharge head 25 discharges a liquid such as ink to a part of the medium M supported by the support section 26 to perform recording on the medium M.

The discharge head 25 discharges a liquid such as ink from the plurality of nozzles toward the medium M while moving in the scanning direction X together with the carriage 24. By alternately repeating a recording operation in which the carriage 24 moves once and the discharge head 25 performs recording one pass, and a transport operation in which the medium M is transported to the next recording position, characters or images are recorded on the medium M. The recording section 23 may use a line recording type. The line recording type recording section 23 includes the discharge head 25 including a line head having a plurality of nozzles capable of simultaneously discharging a liquid over the entire width of the medium having the maximum width. Since the liquid is discharged from the nozzle of the discharge head 25 configured with the line head with the entire width of the medium M as the discharge target with respect to the medium M transported at a constant speed, high-speed recording of an image or the like is realized.

The recording apparatus 11 has an edgeless recording function in which the entire surface of the medium M is a recording target without creating a margin at the end portion of the medium M. The discharge head 25 moves in the scanning direction X in the edgeless recording mode, and discharges an excess liquid to a region come off from the side end of the medium M to the outer side. Accordingly, even when the medium M is displaced within the allowable range in the width direction X due to skew or the like, no margin is formed at the side end portion of the medium M.

The support section 26 is provided with a discard absorbing member 70 which is an example of a first absorbing member that absorbs the liquid discarded from the nozzle to the outer side of the side end of the medium M by the discharge head 25 in the edgeless recording mode. The discard absorbing member 70 is provided so as to cover a part of the surface of the support section 26, which corresponds to the side ends of at least a plurality of types of specified size media M that can be transported.

The recording apparatus 11 illustrated in FIG. 1 includes a control section 100 that performs various types of control. The control section 100 performs control of the carriage 24 and the discharge head 25, transport control of the medium M, display control of the display section 14, voltage control of the power supply unit 75 (refer to FIG. 6) described later, and the like.

As illustrated in FIG. 2, on the back surface portion of the recording apparatus 11, a support guide member 27 is disposed below the feeding tray 22 at the storage position in the vertical direction in a slidable state. The support guide member 27 is disposed at the center of the back surface of the recording apparatus 11. A waste liquid box cover 28 is provided to be turnable at a position on the left of the lower portion of the support guide member 27. The waste liquid box cover 28 can be opened and closed by turning left and right around the left end. At one end portion of the back surface portion of the recording apparatus 11 in the width direction X, a power cable 33A for supplying electric power and a communication cable 33B for communicating with a communication device such as a host computer (not illustrated) are electrically coupled to each other.

Figure 3:
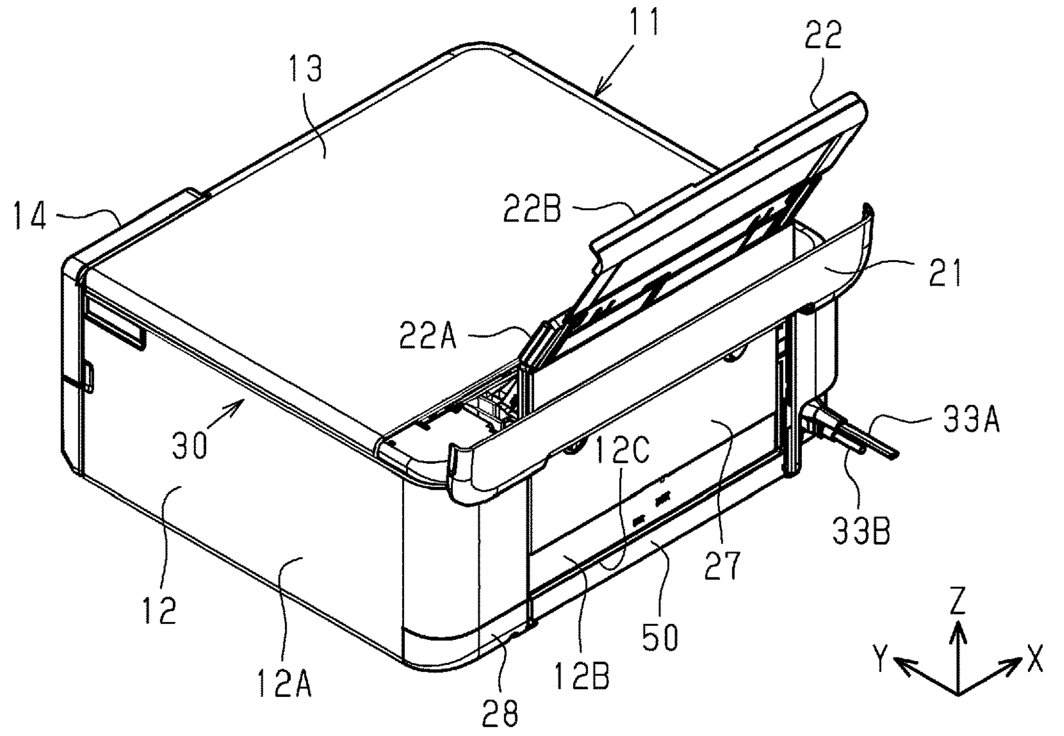
FIG. 3 is a rear perspective view illustrating the recording apparatus in a state where a feeding tray is set.
Figure 4:
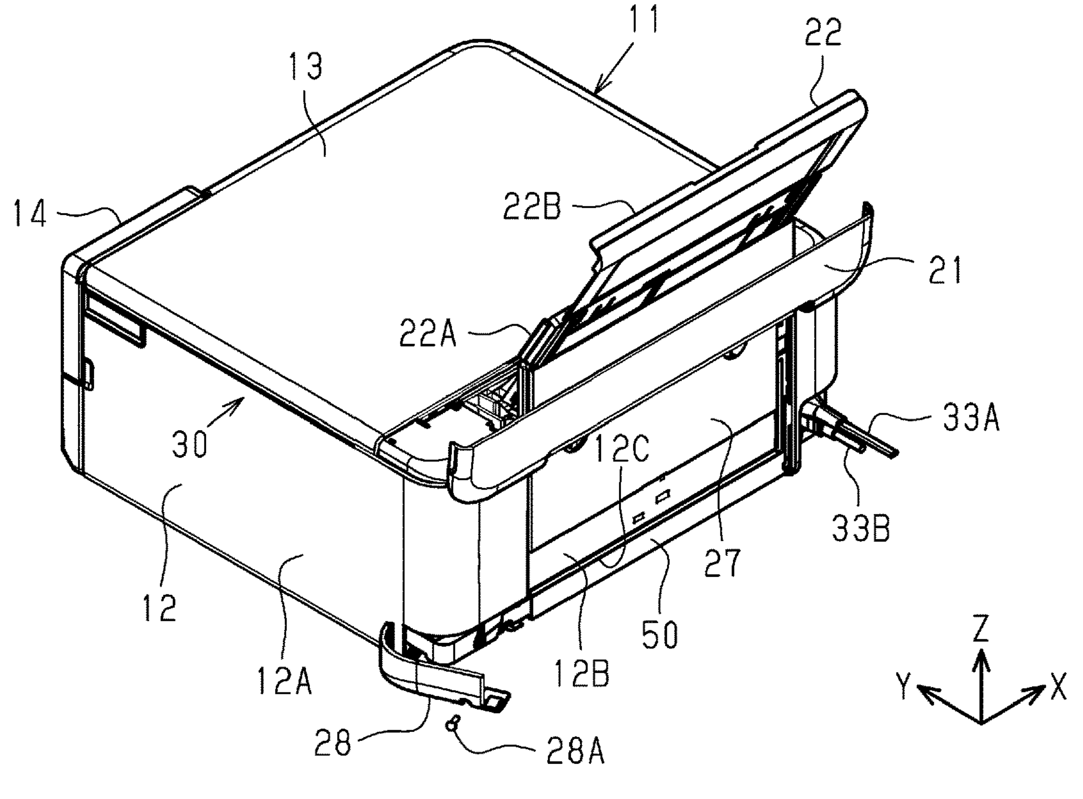
FIG. 4 is a rear perspective view illustrating a recording apparatus in a state where a waste liquid box cover is further opened from a state of FIG. 3.

As illustrated in FIGS. 3 and 4, the support guide member 27 is disposed in a vertical posture that configures a part of the back surface portion of the apparatus main body 12, and both sides of the upper end portion in the width direction are engaged with both side portions of a main support member 22A in the width direction. The support guide member 27 is provided to be slidable in the vertical direction Z in a state where the feeding cover 21 is open. In a state where the feeding cover 21 open, the user can withdraw the feeding tray 22 and the support guide member 27 upward. FIGS. 3 and 4 illustrate a state where the support guide member 27 slides upward and the feeding tray 22 is withdrawn in a rearward inclined state. When the feeding tray 22 is withdrawn upward, the feeding tray 22 is disposed in the oblique posture in which, as the support guide member 27 slides upward, the feeding tray 22 is inclined rearward at a predetermined angle. In this manner, the feeding tray 22 is deployed in the oblique posture in which the medium M can be placed when the medium M is fed from the rear side.

As illustrated in FIGS. 3 and 4, the feeding tray 22 is configured in a multi-stage slide type. The feeding tray 22 is configured such that the main support member 22A and a sub support member 22B are slidably coupled to each other. In FIGS. 3 and 4, the sub support member 22B is slid upward with respect to the main support member 22A, and the feeding tray 22 is in a state of being in use in a rearward inclined posture and extended to be long. The sub support member 22B is used while being extended upward with respect to the main support member 22A. The user sets one or a plurality of media M in the feeding tray 22 which is in the rearward inclined posture. A second feeding section 42 (refer to FIG. 6) feeds the media M set in the feeding tray 22 one by one from the lower side into the apparatus main body 12.

Furthermore, by withdrawing the support guide member 27 upward, a part of the waste liquid collecting unit 50 is exposed at the lower portion of the back surface of the apparatus main body 12. In other words, in a state where the support guide member 27 is slid upward, an opening 12C appears at the lower portion of the apparatus main body 12, and a back surface frame section 12B and the back surface of the waste liquid collecting unit 50, which are covered with the support guide member 27 until this time, are exposed. However, one end portion of the back surface of the waste liquid collecting unit 50 in the width direction X is covered with the waste liquid box cover 28 at the closed position.

FIG. 4 illustrates an open state where the waste liquid box cover 28 is turned to the open position. By unfastening a screw 28A fixed to the apparatus main body 12, the waste liquid box cover 28 becomes turnable. When the waste liquid box cover 28 is turned to the open position, a state where the waste liquid collecting unit 50 can be taken out is achieved. When the user removes the waste liquid collecting unit 50 for replacement, maintenance, or the like, a removable state illustrated in FIG. 4 where the entire back surface portion thereof is exposed is achieved.

Figure 5:
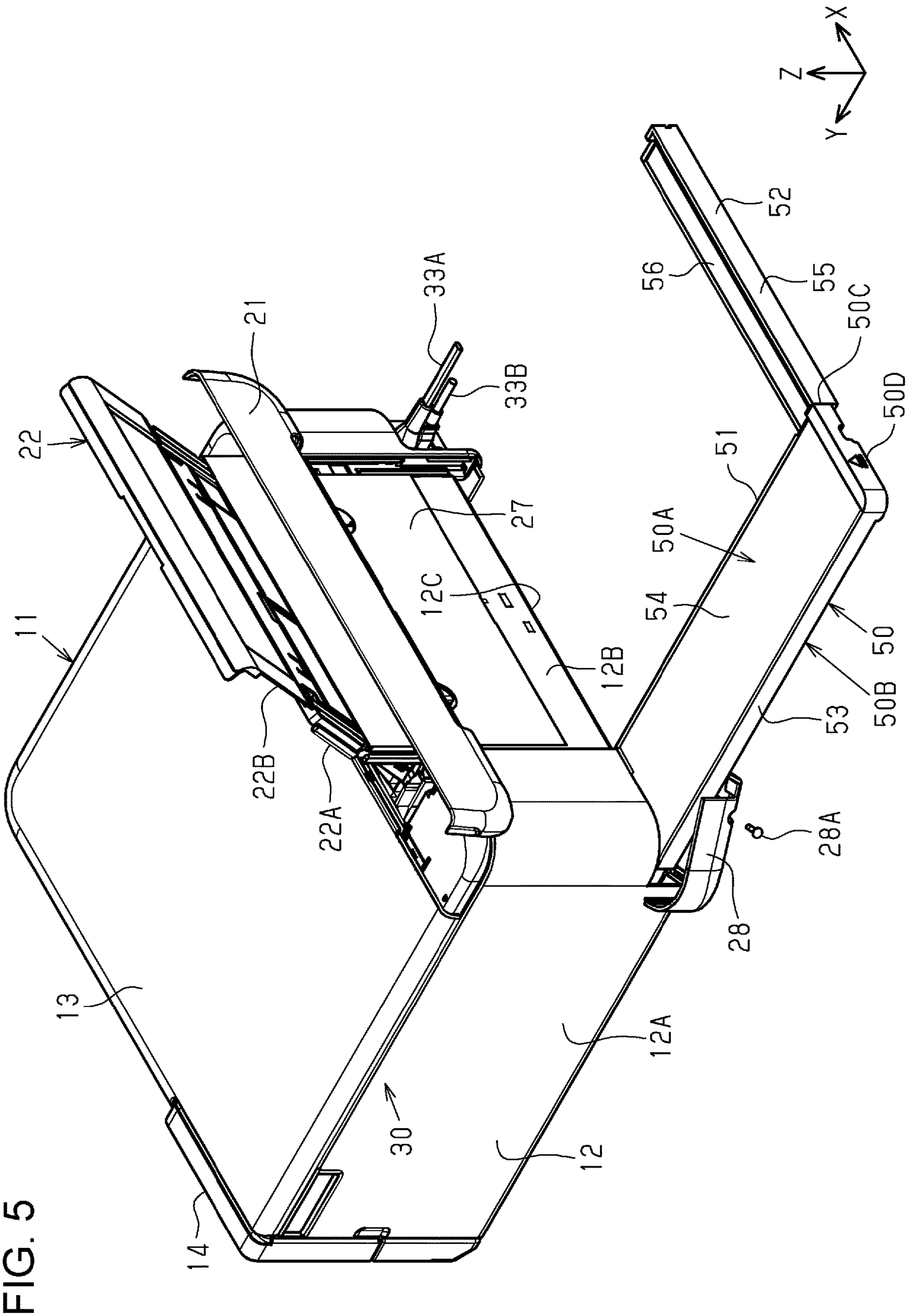
FIG. 5 is a rear perspective view of the recording apparatus in a state where a waste liquid collecting unit is taken out.

FIG. 5 illustrates a state where the waste liquid collecting unit 50 is removed. The waste liquid collecting unit 50 is removed from the apparatus main body 12 by sliding the waste liquid collecting unit 50 in the state illustrated in FIG. 4 toward the upstream in the transport direction Y and drawing out the waste liquid collecting unit 50. As illustrated in FIG. 5, the waste liquid collecting unit 50 includes: a waste liquid absorbing member 50A which is an example of a second absorbing member; and a waste liquid box 50B which is an example of an accommodating section that holds the waste liquid absorbing member 50A. The waste liquid collecting unit 50 is attachable to and detachable from the apparatus main body 12. Therefore, even when the user is not a service person, the waste liquid collecting unit 50 can be replaced by the user himself or herself. The waste liquid box 50B is configured in a long box shape with an open upper part in a posture of being inserted into the apparatus main body 12. The waste liquid absorbing member 50A accommodated in the waste liquid box 50B is in a state where the upper part is exposed.

As illustrated in FIG. 5, the waste liquid absorbing member 50A is disposed at a position closer to one end portion in the width direction X, and includes a long first waste liquid collecting section 51 that extends in the transport direction Y and a long second waste liquid collecting section 52 that is coupled to the upstream end portion of the first waste liquid collecting section 51 in the transport direction Y and extends in the width direction X. The first waste liquid collecting section 51 and the second waste liquid collecting section 52 are coupled to each other at each of the end portions in a state of being orthogonal to each other, and have an L-shape in a plan view. In a state where the L-shaped waste liquid collecting unit 50 is inserted into the apparatus main body 12, the first waste liquid collecting section 51 is positioned below a maintenance device 60 (refer to FIG. 7), and the second waste liquid collecting section 52 is positioned below the second feeding section 42.

The first waste liquid collecting section 51 includes a long box-shaped first waste liquid box section 53 with an open upper part, and a long rectangular plate-shaped first waste liquid absorbing member 54 accommodated in the first waste liquid box section 53. The second waste liquid collecting section 52 includes a long box-shaped second waste liquid box section 55 with an open upper part, and a long rectangular plate-shaped second waste liquid absorbing member 56 accommodated in the second waste liquid box section 55.

In other words, the waste liquid absorbing member 50A includes the long rectangular plate-shaped first waste liquid absorbing member 54 that extends in the transport direction Y, and the long second waste liquid absorbing member 56 which is coupled to the upstream end portion of the first waste liquid absorbing member 54 in the transport direction Y and extends in the width direction X. The waste liquid box 50B includes the first waste liquid box section 53 that accommodates the first waste liquid absorbing member 54 and the second waste liquid box section 55 that accommodates the second waste liquid absorbing member 56. The first waste liquid box section 53 and the second waste liquid box section 55 are coupled to each other at a coupling section 50C in a state where the first waste liquid absorbing member 54 and the second waste liquid absorbing member 56 are in contact with each other and the waste liquid can be moved therebetween. Further, a mark 50D indicating that the waste liquid box 50B can be taken out by the user at one end portion of the back surface of the waste liquid box 50B.

Figure 6:
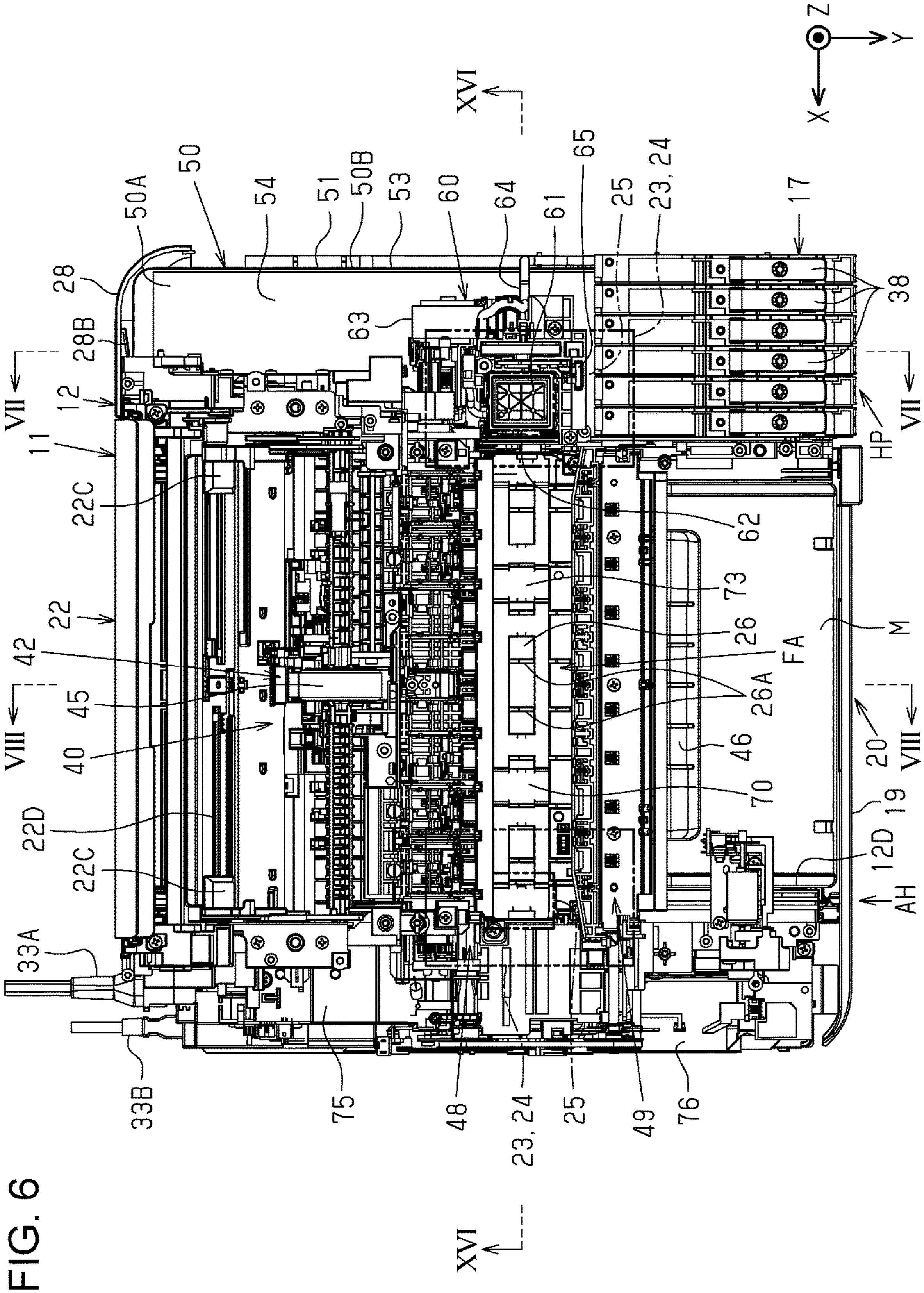
FIG. 6 is a plan view illustrating the recording apparatus in a state where a housing is removed.

As illustrated in FIG. 6, the recording section 23 includes a first feeding section 41 (refer to FIG. 8) and a second feeding section 42 which are for transporting the medium M. The first feeding section 41 feeds the media M accommodated in the cassette 20 one by one in order from the top. An opening 12D capable of storing the cassette 20 is opened at the front portion of the apparatus main body 12. The user can attach and detach the cassette 20 by sliding the cassette 20 from the opening 12D along the wall surface.

The second feeding section 42 includes a pair of guide sections 22C operated by the user for positioning the medium M set in the feeding tray 22 in the width direction X, and a moving mechanism 22D that can be moved in the width direction X in conjunction with the pair of guide sections 22C. The second feeding section 42 includes a feeding roller 45. By the rotation of the feeding roller 45, the medium M set in the feeding tray 22 is fed to a recording region of the recording section 23.

Figure 8:
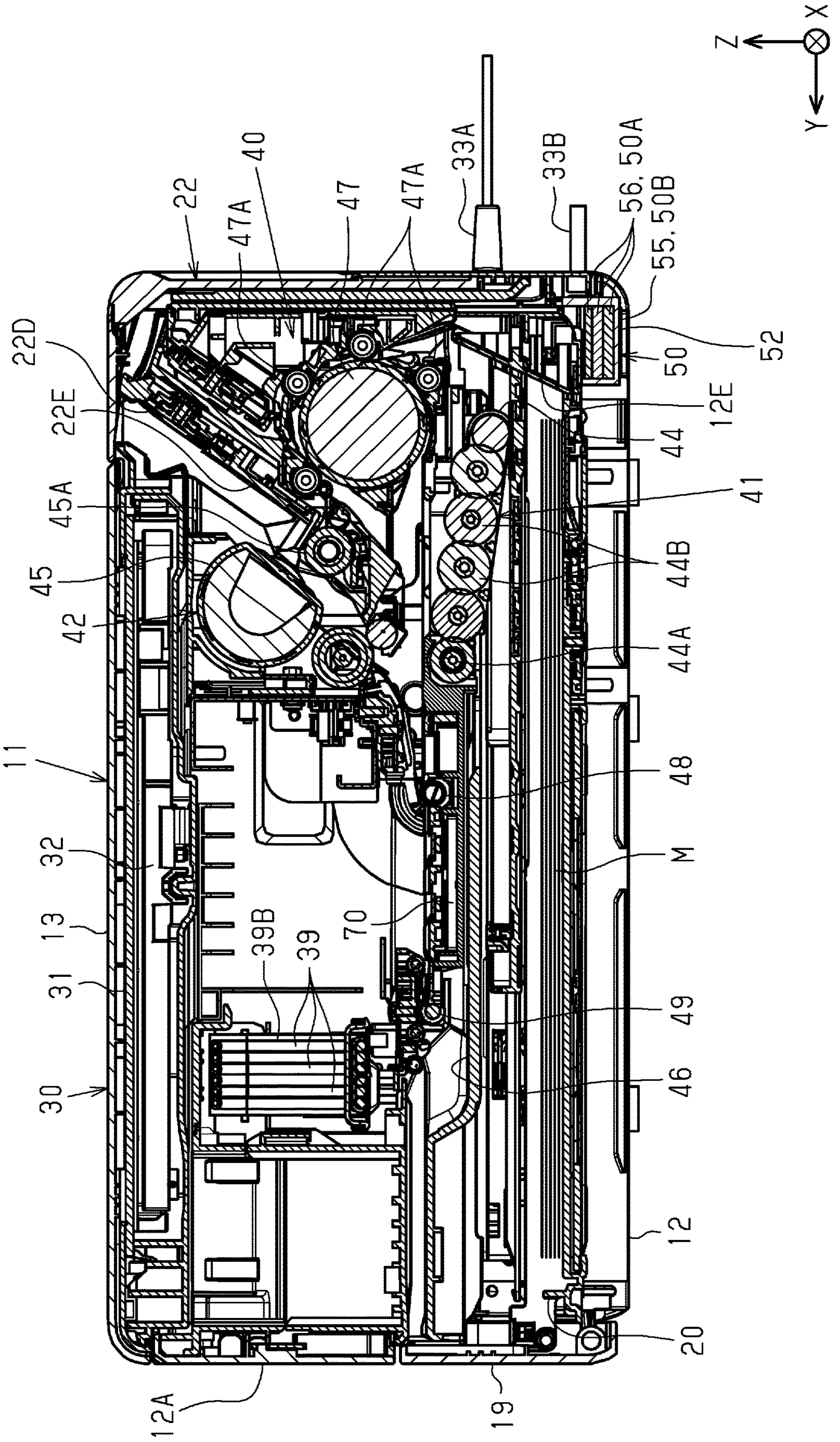
FIG. 8 is a side sectional view illustrating the recording apparatus taken along the line VIII-VIII of FIG. 6.

The recording apparatus 11 includes a transport roller pair 48 that transports the medium M fed from the first feeding section 41 or the second feeding section 42 in the transport direction Y. The support section 26 is disposed at a position downstream of the transport roller pair 48 in the transport direction Y. An eject roller pair 49 is disposed at a position opposite to the transport roller pair 48 with the support section 26 sandwiched therebetween in the transport direction Y. The eject roller pair 49 nips and transports a part of the medium M on which the recording is finished by the recording section 23, for example, at a position downstream of the transport roller pair 48 in the transport direction Y. The medium M transported from the eject roller pair 49 in the transport direction Y is ejected onto a stacker 46. As illustrated in FIG. 8, the stacker 46 is disposed so as to overlap the discard absorbing member 70 in the stored state, and is not illustrated, but when the medium M is ejected, the stacker 46 moves by a manual operation by the user in the Y direction or an automatic operation by a power source (not illustrated) to be in an extended state. By disposing the stacker 46 in this manner, it is possible to suppress the size of the recording apparatus 11 in the depth direction to be small in the stored state of the stacker 46.

As illustrated in FIG. 6, the recording section 23 reciprocates in the width direction X between a home position HP positioned at the right end portion in the apparatus main body 12 and an opposite-home position AH positioned at the left end portion in the apparatus main body 12 in FIG. 6.

The liquid supply source 17 illustrated in FIG. 6 is provided with a cap cover 38 that can be opened and closed at the upper portion of the liquid supply source 17. In the example, the liquid supply source 17 is a tank in which the liquid is accommodated. When there is the liquid supply source 17, of which the remaining amount is small, through the window section 18 (refer to FIG. 1), the user opens the cap cover 38 to expose a pour 17A (refer to FIG. 7) of the liquid supply source 17. Then, the user pours the liquid from the liquid bottle into the pour 17A of the liquid supply source 17. The liquid supply source 17 is not limited to a liquid replenishment type tank in which the user replenishes the liquid from the liquid bottle, and may be a liquid pack (for example, an ink pack) or a liquid cartridge (for example, an ink cartridge) in which the liquid is accommodated. The liquid supply source 17 is not limited to an off-carriage type provided in the apparatus main body 12, but may be an on-carriage type mounted on the carriage 24.

The liquid is supplied to the recording section 23 from the liquid supply source 17 through a liquid supply tube 39 (refer to FIG. 8). The recording section 23 performs recording on the medium M which is transported by the transport section 40 and supported by the support section 26.

In FIG. 6, while the recording section 23 reciprocates in the scanning direction X, the discharge head 25 performs recording on the medium M by alternately performing the recording operation in which the discharge head 25 discharges the liquid toward the medium M supported by the support section 26 and the recording is performed by one scanning, and the transport operation in which the medium M is transported by the roller pairs 48 and 49 to the next recording position.

The recording apparatus 11 has an edgeless recording mode in which the edgeless recording is possible of which the entire surface of the medium M is a recording target. When the user selects the edgeless recording mode when setting the recording conditions, the recording section 23 discharges the liquid from the discharge head 25 to the recording region that protrudes to the outer side from the side end of the medium M in the width direction X. In other words, in the recording apparatus 11 illustrated in FIG. 6, the liquid is also discarded to the outer side from the side end of the medium M supported by the support section 26 in the width direction X, by the discharge head 25. Accordingly, even when the transport position of the medium M in the width direction X varies within the allowable range due to skew or the like, it is possible to avoid forming a margin at the end portion of the medium M in the width direction X. The amount of protrusion that protrudes to the outer side from the side end of the medium M for discharging the liquid is set to, for example, a predetermined length within the range of 1 to 5 mm.

As illustrated in FIG. 6, the recording apparatus 11 includes the discard absorbing member 70 which is an example of a first absorbing member that absorbs the liquid discarded to the outer side of the medium M supported by the support section 26 from the discharge head 25. The support section 26 has a plurality of ribs 26A that support the medium M in a state of projecting upward at positions spaced apart from each other in the width direction X. The surface of a part of the support section 26 other than the rib 26A is partially covered with the discard absorbing member 70. The discard absorbing member 70 absorbs the liquid discarded to the outer side of the medium M as a waste liquid.

The maintenance device 60 is disposed below the recording section 23 when the recording section 23 is at the home position HP. The maintenance device 60 performs maintenance with respect to the discharge head 25 of the recording section 23. The maintenance device 60 includes a cap 61 that caps the discharge head 25 when the carriage 24 is at the home position HP, and a wiper 62 that wipes the nozzle surface of the discharge head 25. By capping the discharge head 25 with the cap 61, thickening or drying of a liquid such as ink in the nozzle of the discharge head 25 is suppressed. When the liquid in the nozzle becomes thick, there are air bubbles in the liquid in the nozzle, or the nozzle is blocked by foreign matters such as paper dust, a discharge failure occurs in which the liquid cannot be discharged normally from the nozzle due to clogging of the nozzle.

The maintenance device 60 cleans the nozzle of the discharge head 25 in order to eliminate or prevent this type of discharge failure. At the time of cleaning, the maintenance device 60 forcibly ejects the liquid from the discharge head 25 to the cap 61. The maintenance device 60 includes a suction pump 63 that communicates with the cap 61. The maintenance device 60 drives the suction pump 63 under a capping state where the cap 61 is in contact with the nozzle surface of the discharge head 25 in a state of surrounding the nozzle. When the suction pump 63 is driven, the liquid is forcibly ejected from the nozzle by the negative pressure introduced into the closed space between the nozzle surface of the discharge head 25 and the cap 61. The liquid such as ink including foreign matters such as thickened liquid, air bubbles, and paper dust is forcibly ejected from the nozzle, and accordingly, the discharge failure of the nozzle is prevented or eliminated. The cap 61 at the time of cleaning is held in a capping state of being in contact with the nozzle surface of the discharge head 25 by the urging force of a spring 61A (refer to FIG. 11).

The recording section 23 moves to the home position HP periodically or irregularly during the recording, performs idle discharge (also referred to as "flushing") for discharging liquid droplets from all of the nozzles toward the cap 61, and accordingly, the discharge failure during the recording is prevented. The liquid (waste liquid) ejected from the nozzle into the cap 61 by cleaning and idle discharge is sent from the cap 61 to the waste liquid collecting unit 50 through a waste liquid tube 64 by driving the suction pump 63. Specifically, the waste liquid sent from the cap 61 through the waste liquid tube 64 by driving the suction pump 63 is ejected to the first waste liquid collecting section 51 positioned below the maintenance device 60 in the waste liquid collecting unit 50.

Figure 7:
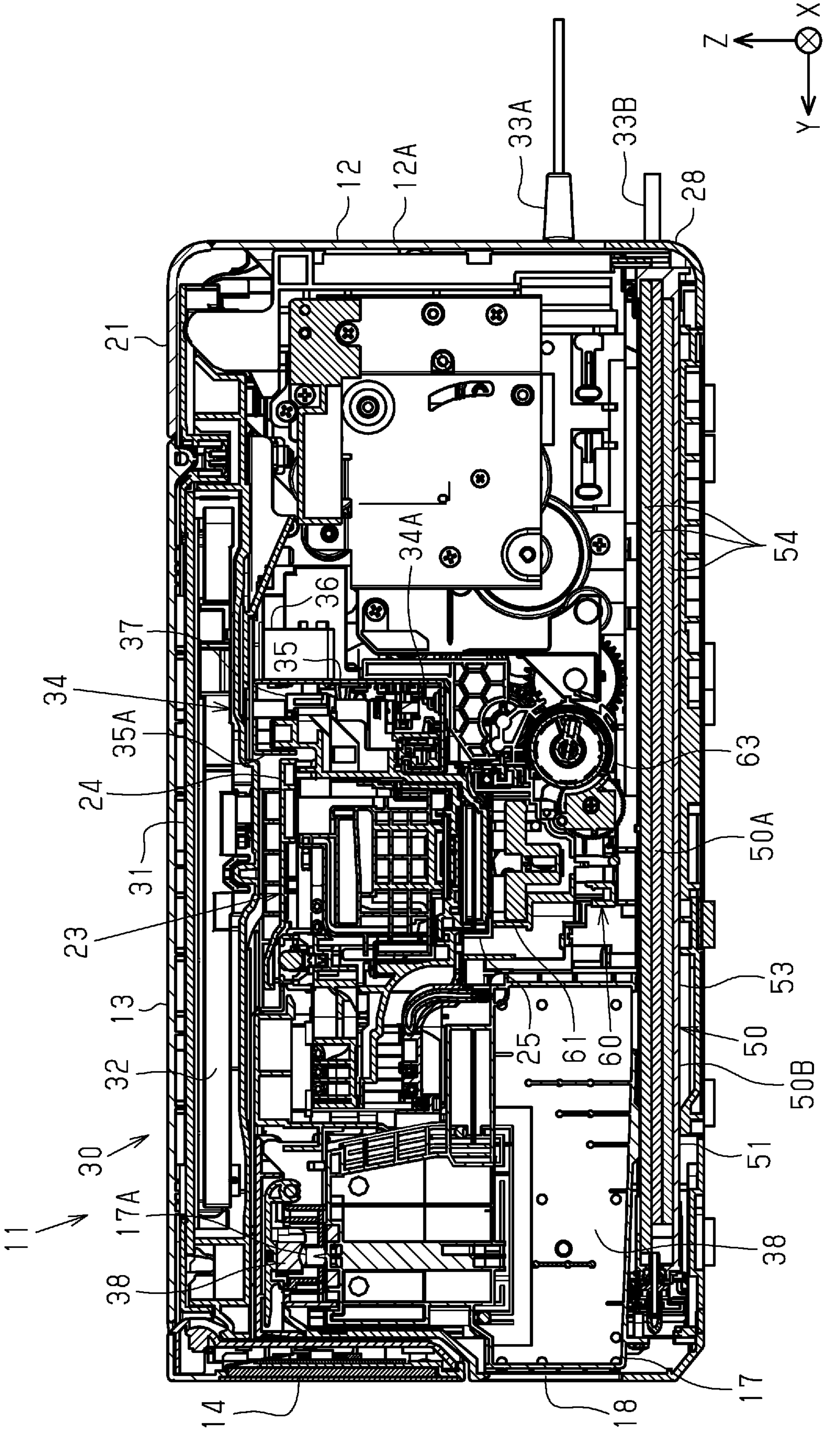
FIG. 7 is a side sectional view illustrating the recording apparatus taken along the line VII-VII of FIG. 6.

As illustrated in FIGS. 6 and 7, the waste liquid absorbing member 50A is disposed below the maintenance device 60 and the liquid supply source 17. The maintenance device 60 and the waste liquid absorbing member 50A have a part where the positions in the front-rear and left-right directions are the same, and overlap each other at the part in the vertical direction Z. In other words, the maintenance device 60 and the waste liquid absorbing member 50A partially overlap each other in the vertical direction Z. In this manner, the waste liquid absorbing member 50A is disposed below the maintenance device 60. Accordingly, the liquid such as ink scattered by the maintenance device 60 can be absorbed by the waste liquid absorbing member 50A.

As illustrated in FIG. 6, there is at least a part where the positions of the waste liquid absorbing member 50A and the liquid supply source 17 in the front-rear and left-right directions are the same position, and the waste liquid absorbing member 50A and the liquid supply source 17 overlap each other at least at the part in the vertical direction Z. In other words, the waste liquid absorbing member 50A and the liquid supply source 17 at least partially overlap each other in the vertical direction Z. In this manner, the waste liquid absorbing member 50A is disposed below the liquid supply source 17. Accordingly, when the user replenishes a liquid such as ink from the pour 17A of the liquid supply source 17, even when the liquid is accidentally spilled, the waste liquid absorbing member 50A thereunder can absorb the liquid.

Furthermore, since the space above the waste liquid absorbing member 50A accommodated in the waste liquid box 50B is empty, the drying of the liquid such as ink from the waste liquid absorbing member 50A is promoted, and the capacity of the waste liquid that can be absorbed by the waste liquid absorbing member 50A increases.

When there accumulates a certain amount of the waste liquid absorbed by the discard absorbing member 70 after the liquid is discarded from the discharge head 25 during the edgeless recording or the like, the waste liquid flows from the discard absorbing member 70 to the waste liquid box 50B by the capillary phenomenon and the action of gravity. The discard absorbing member 70 and the waste liquid absorbing member 50A are coupled to each other in a state where the waste liquid can be delivered. The details of the mechanism for delivering the waste liquid will be described later.

As illustrated in FIG. 6, at one end portion in the width direction X at the rear end portion of the recording apparatus 11, the power supply unit 75, which converts the electric power of a predetermined voltage supplied from the power cable 33A into a predetermined voltage that can be used by the recording apparatus 11, is disposed. The waste liquid absorbing member 50A and the power supply unit 75 are disposed facing each other with the discard absorbing member 70 sandwiched therebetween. In other words, the waste liquid absorbing member 50A and the power supply unit 75 are disposed at positions on both sides of the discard absorbing member 70 in the width direction X. The first waste liquid absorbing member 54 and the power supply unit 75 that configure the waste liquid absorbing member 50A are disposed separately in the accommodation spaces (accommodating spaces) on both sides sandwiching a transport region FA which is the region where the medium M is transported. The support section 26 is disposed in the transport region FA in a plan view of FIG. 6. Since the power supply unit 75 and the replaceable waste liquid collecting unit 50 are components that occupy a large part of the accommodation space in the apparatus main body 12, the entire component layout of the recording apparatus 11 can be further optimized by disposing the transport regions FA separately in the accommodation spaces on both sides spaced apart from each other.

The recording apparatus 11 illustrated in FIG. 7 includes the image reading device 30 (scanner) on the upper portion of the apparatus main body 12. The image reading device 30 includes the document holder 31 having a glass plate on which a document is set, and a reading mechanism 32 having a movable image sensor (not illustrated) for reading the document set on the document holder 31.

As illustrated in FIG. 7, a main frame 35 extends in the width direction X in the apparatus main body 12. The main frame 35 has a guide rail 35A that guides the carriage 24. The carriage 24 reciprocates in the scanning direction X by being guided by the guide rail 35A. A moving mechanism 34 for moving the carriage 24 in the scanning direction X is provided between the main frame 35 and the carriage 24. The moving mechanism 34 is, for example, a belt drive type, and includes a carriage motor 36 which is a driving source of the carriage 24, and an endless timing belt 34A stretched along the scanning direction X. The carriage 24 is fixed to a part of the timing belt 34A. When the carriage motor 36 drives forwardly and reversely, the carriage 24 reciprocates in the scanning direction X via the timing belt 34A.

The main frame 35 is provided with a linear encoder 37 for detecting the position of the recording section 23 in the scanning direction X. The linear encoder 37 includes a linear scale that extends along the scanning direction X and a sensor (not illustrated) attached to the carriage 24. The sensor detects the light transmitted to the linear scale through a light transmitting section formed at a constant pitch, and outputs a pulse signal having the number of pulses proportional to the movement amount of the carriage 24. The control section 100 (refer to FIG. 1) includes a counter (not illustrated) that counts the number of pulse edges of the pulse signal input from the linear encoder 37, and the position of the carriage 24 in the scanning direction X from the counted value of the counter, that is, the carriage position is acquired.

As illustrated in FIG. 8, the recording apparatus 11 includes the cassette 20 that accommodates the medium M below the discharge head 25, and the first feeding section 41 that feeds the media M accommodated in the cassette 20 one by one toward the recording position of the discharge head 25. The waste liquid absorbing member 50A is disposed so as to partially overlap below the first feeding section 41. Specifically, as illustrated in FIG. 8, the second waste liquid absorbing member 56 of the waste liquid absorbing member 50A is disposed so as to overlap below the first feeding section 41.

As illustrated in FIG. 8, the first feeding section 41 is disposed above the medium M accommodated in the cassette 20. The first feeding section 41 includes a pickup roller 44 as a feeding roller for feeding the medium M. The first feeding section 41 includes a power transmission mechanism configured with a row (gear train) of a driving shaft 44A that rotates by the power from the feeding motor (not illustrated), the pickup roller 44, and a plurality of gears 44B interposed between the driving shaft 44A and the pickup roller 44. A separation plate 12E is disposed at a position slightly upstream of the distal end on the upstream of the cassette 20 in the transport direction Y. The separation plate 12E separates the uppermost medium M from the subsequent medium M by abutting against the distal end portion of the medium M sent out from the cassette 20 by the pickup roller 44. In other words, the separation plate 12E prevents double feeding by separating the medium M into one sheet. The separation plate 12E configures a part of the first feeding section 41. After the medium M is separated into one sheet, the transport direction is changed by a reversing roller 47, and the medium M is transported toward the recording position of the discharge head 25. As illustrated in FIG. 8, the separation plate 12E that configures the first feeding section 41 partially overlaps the second waste liquid absorbing member 56 of the waste liquid box 50B in the vertical direction Z. In this manner, the waste liquid absorbing member 50A overlaps below the first feeding section 41.

By disposing the replaceable waste liquid collecting unit 50 in a state of overlapping below the separation plate 12E of the first feeding section 41, assuming that the capacity of the absorbing member is the same, it is possible to suppress the size of the recording apparatus 11 in the depth direction to be small compared to a configuration in which the waste liquid absorbing member 50A is disposed at another place.

As illustrated in FIG. 8, the recording apparatus 11 includes the second feeding section 42 having the feeding tray 22 which is an example of a placement section on which the medium M is placed, the feeding roller 45 that feeds the medium M placed on the feeding tray 22 toward the recording position of the discharge head 25, and a hopper 22E that presses the medium M set on the feeding tray 22 against the feeding roller 45. The media M pressed against the outer peripheral surface of the feeding roller 45 by the hopper 22E are fed one by one toward the recording position of the discharge head 25 in a state of being nipped between the rotating feeding roller 45 and a retard roller 45A. At this time, the medium M does not pass through the reversing roller 47. The liquid supply tube 39 for supplying the liquid from the liquid supply source 17 to the recording section 23 is disposed at an obliquely upper position of the eject roller pair 49. The liquid supply tube 39 is routed along the width direction X in a state of a tube bundle 39B in which a plurality of tubes are bundled, and is coupled to the carriage 24 in a state of allowing the carriage 24 to move in the scanning direction X.

The waste liquid absorbing member 50A is disposed so as to overlap below the second feeding section 42. Specifically, the second waste liquid absorbing member 56 of the waste liquid absorbing member 50A is disposed so as to overlap below the upper end portion of the hopper 22E of the second feeding section 42. Accordingly, the size of the recording apparatus 11 in the depth direction can be suppressed. In the stored state of the feeding tray 22 illustrated in FIG. 8, the second waste liquid absorbing member 56 may be disposed so as to overlap below the upper end portion of the moving mechanism 22D including the pair of guide sections 22C (refer to FIG. 6) that configure the feeding tray 22. According to this configuration, the size of the recording apparatus 11 in the depth direction can be suppressed.

The recording apparatus 11 illustrated in FIG. 8 has a double-sided recording function capable of performing the recording on both the first surface and the second surface of the medium M. The recording apparatus 11 includes the reversing roller 47 which is an example of a reversing section that reverses the medium M, on which the recording is finished on the first surface by the discharge head 25 and which is switched back and transported further to the upstream of the discharge head 25 in the transport direction Y, such that the second surface can face the discharge head 25. A plurality of driven rollers 47A are provided along the outer peripheral surface of the reversing roller 47. The reversing roller 47 is also used to bend and reverse the medium M along the transport path when the medium M is sent from the first feeding section 41 to the recording section 23 as described above. The waste liquid absorbing member 50A is disposed in a partially overlapping state below the reversing roller 47. Specifically, the second waste liquid absorbing member 56 that extends in the width direction X at the rear end portion of the waste liquid absorbing member 50A is disposed in a partially overlapping state below the reversing roller 47. By partially overlapping the second waste liquid absorbing member 56 and the reversing roller 47 each other in the vertical direction Z, it is possible to suppress the size of the recording apparatus 11 in the depth direction to be short.

Figure 9:
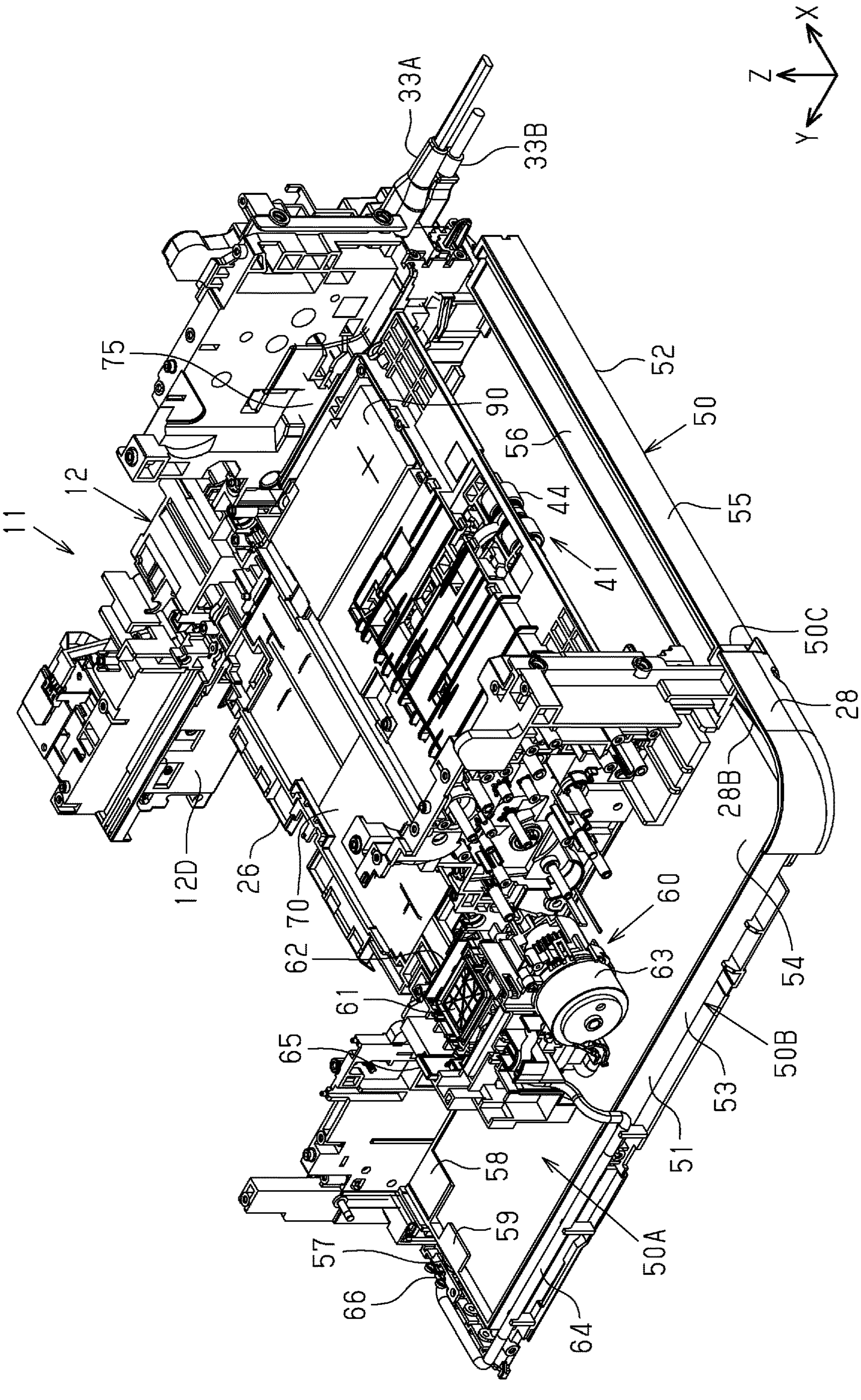
FIG. 9 is a perspective view illustrating the recording apparatus in which an upper portion including a recording system is removed.

FIG. 9 is a perspective view of the inside of the recording apparatus 11 when viewed from the rear part of the back surface. As illustrated in FIG. 9, the waste liquid tube 64 that extends from the maintenance device 60 is disposed so as to extend along the outer side surface of the first waste liquid absorbing member 54 inserted into the apparatus main body 12, and a joining section 66 fixed to the distal end portion is joined to a joined section 57 provided at the front end portion of the waste liquid box 50B. Accordingly, the liquid (waste liquid) received by the cap 61 is ejected to the first waste liquid absorbing member 54 through the waste liquid tube 64 by driving the suction pump 63. In this manner, the waste liquid received by the cap 61 is absorbed by the waste liquid absorbing member 50A through the waste liquid tube 64.

As illustrated in FIG. 9, a storage element 58 (substrate) is fixed to the front end portion of the waste liquid box 50B. When the waste liquid box 50B is inserted into the apparatus main body 12, the storage element 58 is electrically coupled to the apparatus main body 12 side. Further, at the front end portion of the waste liquid box 50B, a scattering prevention wall 59 is formed at a position near the joined section 57.

As illustrated in FIG. 9, in the discard absorbing member 70 that receives a liquid such as ink discarded to the outer side of the side end of the medium M during edgeless recording, one end portion on the home position HP side in the width direction X is adjacent to the maintenance device 60 via a small gap. It is configured that a waste liquid such as waste ink can be delivered from the discard absorbing member 70 toward the waste liquid absorbing member 50A. The waste liquid absorbing member 50A is positioned below the discard absorbing member 70 in the vertical direction Z. Therefore, the waste liquid can be delivered from the discard absorbing member 70 to the waste liquid absorbing member 50A by using gravity.

Figure 10:
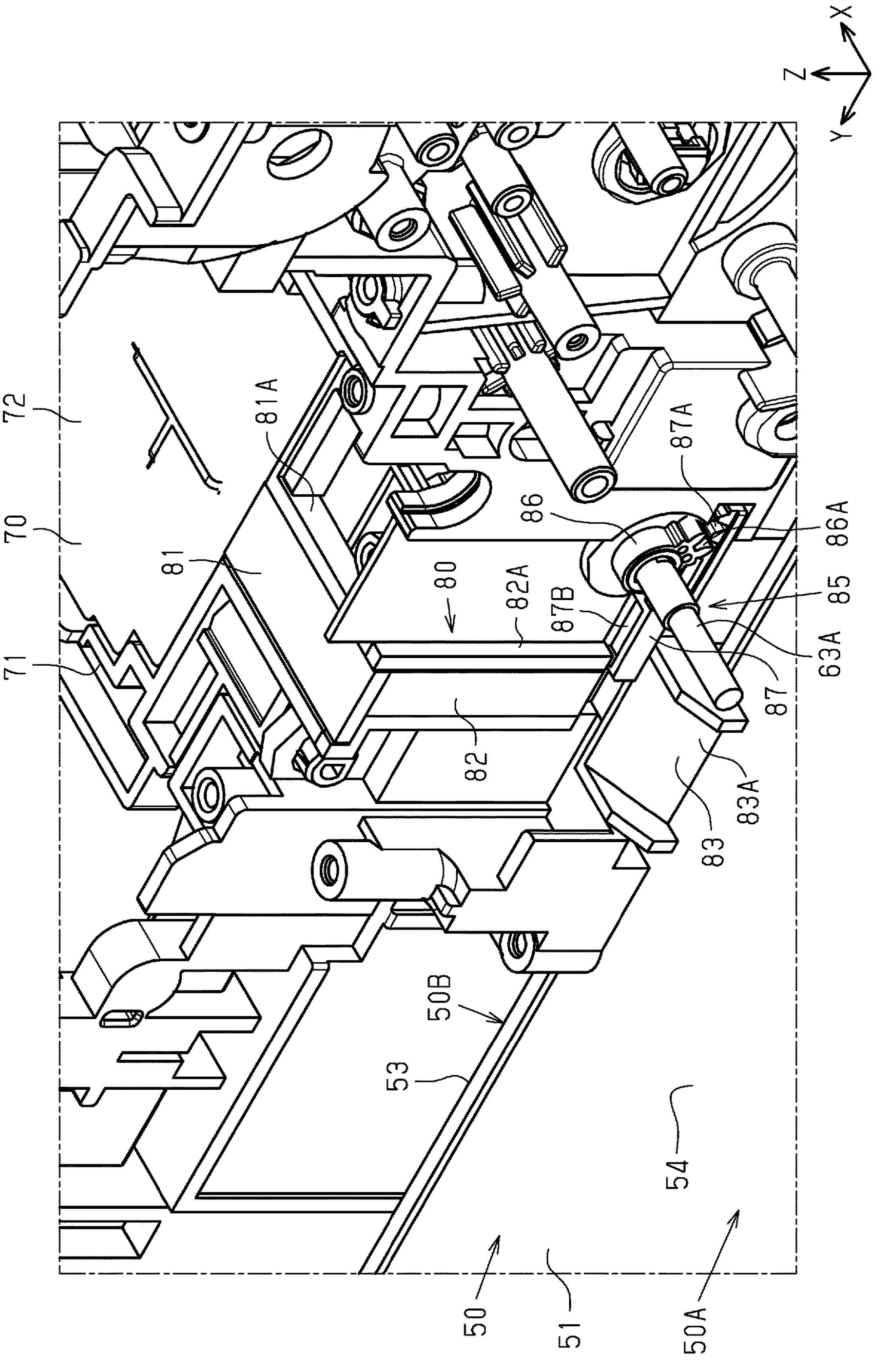
FIG. 10 is an enlarged perspective view illustrating a delivery mechanism.

In this embodiment, as illustrated in FIG. 10, a delivery mechanism 80 which is an example of a delivery section that delivers the waste liquid is disposed between the discard absorbing member 70 and the maintenance device 60. The delivery mechanism 80 delivers the waste liquid from the discard absorbing member 70 to the waste liquid absorbing member 50A by using the gravity and the capillary phenomenon. Therefore, the delivery mechanism 80 can deliver the waste liquid from the discard absorbing member 70 to the waste liquid absorbing member 50A without using a driving source such as a pump. Since the waste liquid on the discard absorbing member 70 side flows to the waste liquid absorbing member 50A, it is not necessary to replace the discard absorbing member 70.

Figure 11:
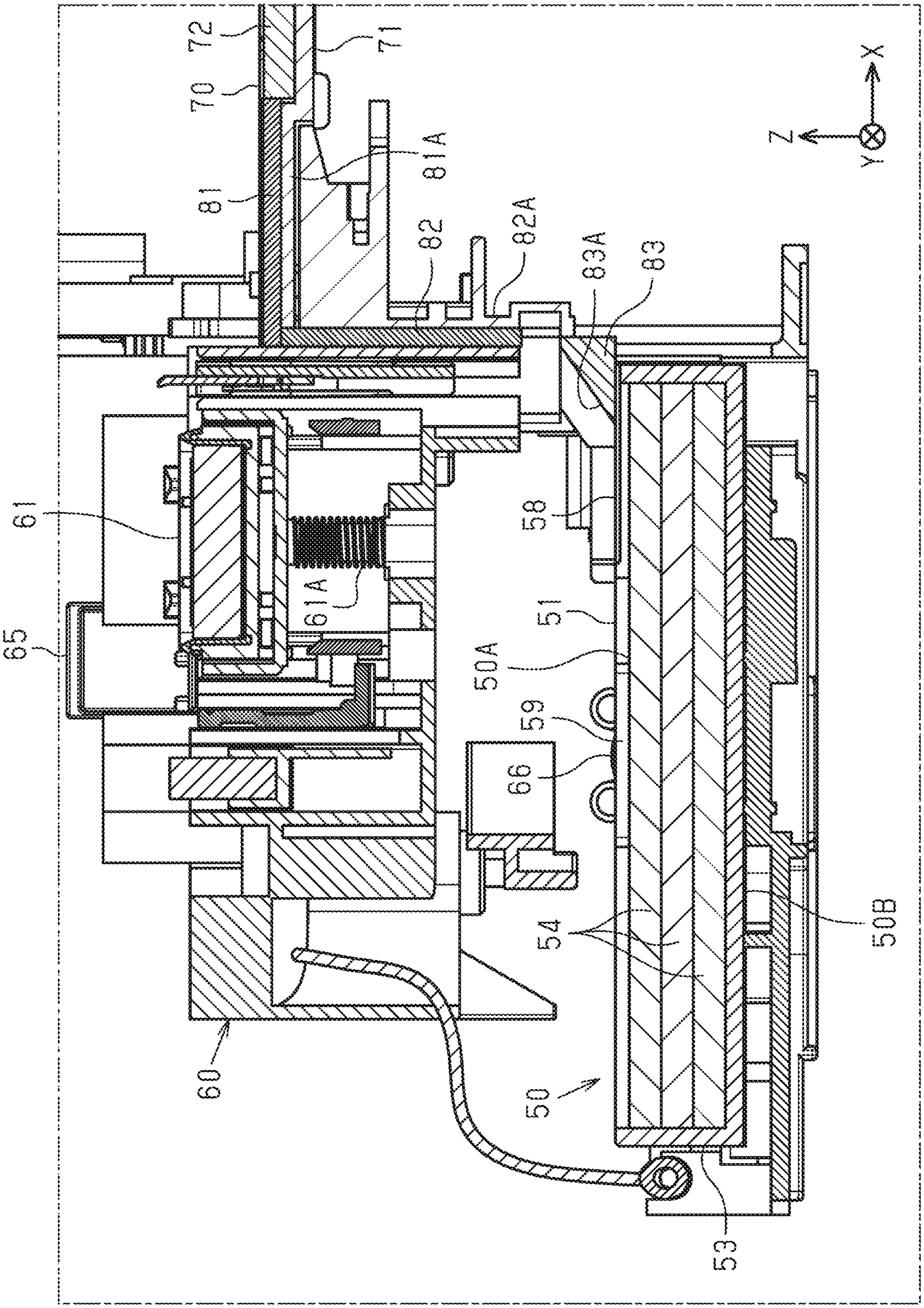
FIG. 11 is a rear sectional view illustrating the waste liquid collecting unit and the delivery mechanism.

FIGS. 10 and 11 illustrate a structure of the delivery mechanism 80 that delivers the waste liquid from the discard absorbing member 70 to the waste liquid absorbing member 50A. The delivery mechanism 80 includes a first coupling absorbing member 81 and a second coupling absorbing member 82 coupled thereto at one end portion of the first coupling absorbing member 81. The first coupling absorbing member 81 is coupled to one end portion of the discard absorbing member 70 on the maintenance device 60 side. The other end portion of the first coupling absorbing member 81 on the side opposite to the one end portion on the discard absorbing member 70 side is coupled to the upper end portion of the second coupling absorbing member 82 disposed in a posture that extends in the vertical direction Z. The first coupling absorbing member 81 is held in a nearly horizontal posture by being held by a holding section 81A. The holding section 81A may be inclined downward toward the delivery mechanism 80, and accordingly, the waste liquid can easily move to the waste liquid absorbing member 50A. The second coupling absorbing member 82 is held in a nearly vertical posture by being supported by a holding section 82A.

The lower end of the second coupling absorbing member 82 faces a waste liquid guide section 83 with a space therebetween. The waste liquid guide section 83 has a slope 83A that receives the waste liquid dripping from the lower end of the second coupling absorbing member 82 and guides the received waste liquid to the waste liquid absorbing member 50A. The slope 83A is a surface that inclines in a direction in which the height decreases toward the outer side (left side in FIG. 11) in the width direction X from a position facing the lower end of the second coupling absorbing member 82. In this manner, in this embodiment, the waste liquid from the discard absorbing member 70 side is delivered to the waste liquid absorbing member 50A through the slope 83A via the coupling absorbing members 81 and 82. The lower end of the second coupling absorbing member 82 faces the waste liquid guide section 83 with a space therebetween, and further, the waste liquid guide section 83 and the waste liquid absorbing member 50A are disposed so as to overlap each other in the width direction X. Accordingly, even when the recording apparatus 11 is disposed to be tilted, it is possible to prevent the movement of the waste liquid from the waste liquid absorbing member 50A to the discard absorbing member 70 and suppress the leakage of the waste liquid from the discard absorbing member 70.

Figure 12:
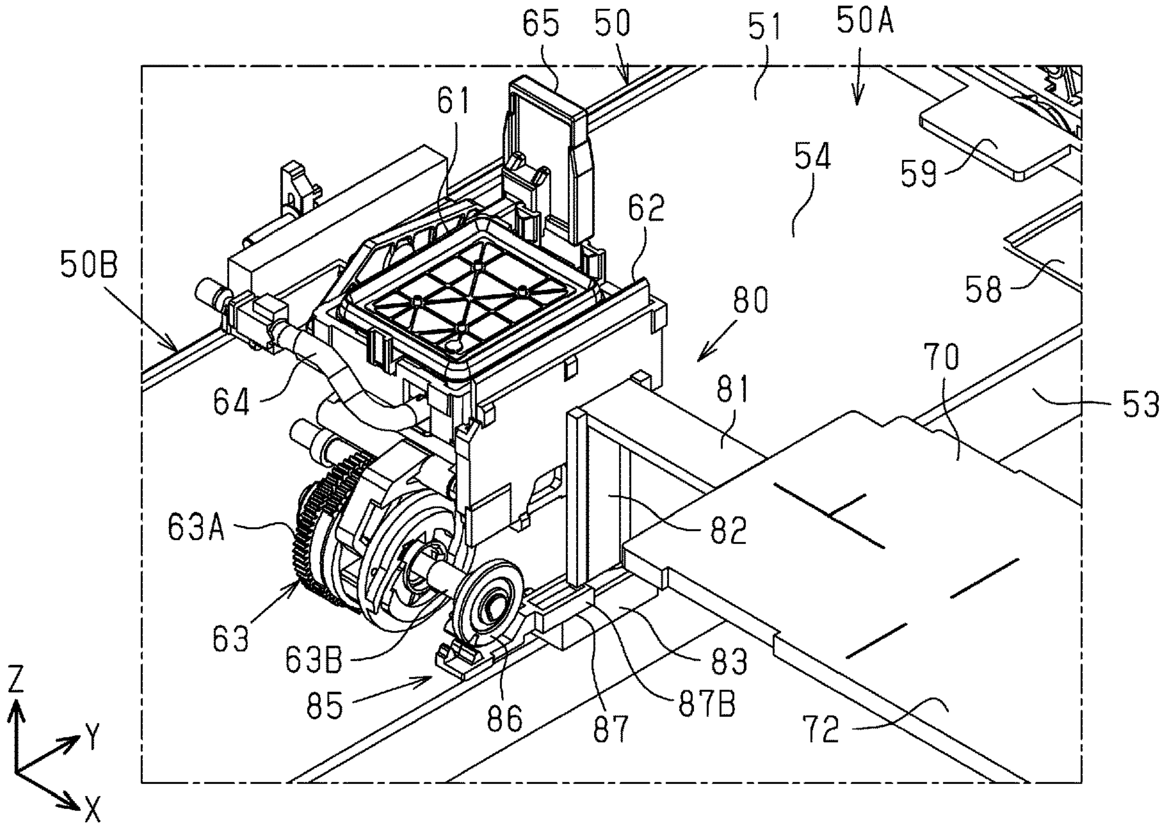
FIG. 12 is a perspective view illustrating a blocking mechanism that does not block delivery of a waste liquid by the delivery mechanism.

As illustrated in FIG. 12, the recording apparatus 11 includes a blocking mechanism 85 as an example of a blocking section capable of temporarily blocking the delivery of the liquid between the discard absorbing member 70 and the waste liquid absorbing member 50A. Therefore, even when the waste liquid collecting unit 50 is removed from the apparatus main body 12 for replacement, the waste liquid delivered via the delivery mechanism 80 is prevented from leaking at the point disconnected from the delivery mechanism 80.

As illustrated in FIG. 12, the maintenance device 60 includes a driving mechanism 63A that inputs power from a transport motor (not illustrated). The driving mechanism 63A includes a group of gears and a group of cams for driving the maintenance device 60. As each gear of the driving mechanism 63A rotates, components such as the suction pump 63, the cap 61, the wiper 62, a carriage lock member 65, and a valve mechanism (not illustrated) are respectively driven.

The blocking mechanism 85 illustrated in FIG. 12 is driven by using power of the maintenance device 60. The driving mechanism 63A has a driving shaft 63B that outputs power to the blocking mechanism 85. The blocking mechanism 85 includes an intermittent gear 86 fixed to the distal end portion of the driving shaft 63B of the driving mechanism 63A, and a slide gear 87 that can be intermittently meshed with the intermittent gear 86. In a normal state other than that when the waste liquid box 50B is attached and detached, the slide gear 87 is disposed at the retracted position where the slide gear 87 is retracted rearward as illustrated in FIG. 12, and the second coupling absorbing member 82 and the waste liquid absorbing member 50A can deliver the waste liquid. In other words, in the normal state, the blocking mechanism 85 is switched to a state where the waste liquid can be delivered from the discard absorbing member 70 to the waste liquid absorbing member 50A via the delivery mechanism 80.

Figure 13:
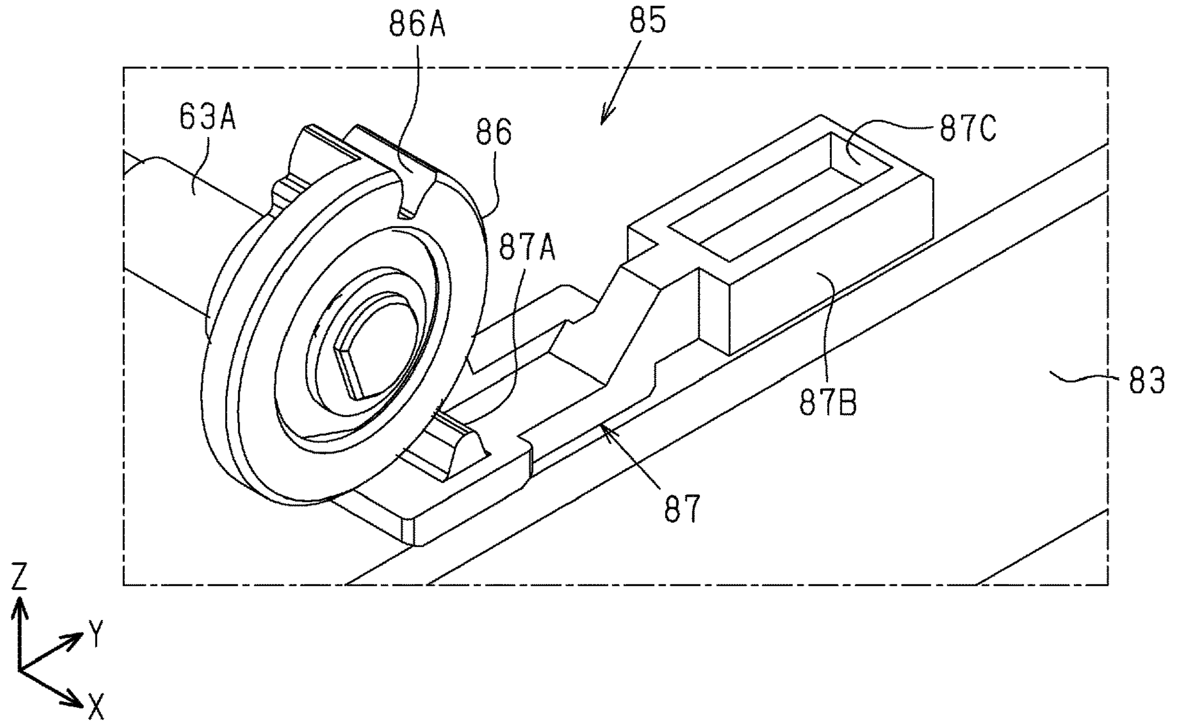
FIG. 13 is an enlarged perspective view illustrating the blocking mechanism.
Figure 14:
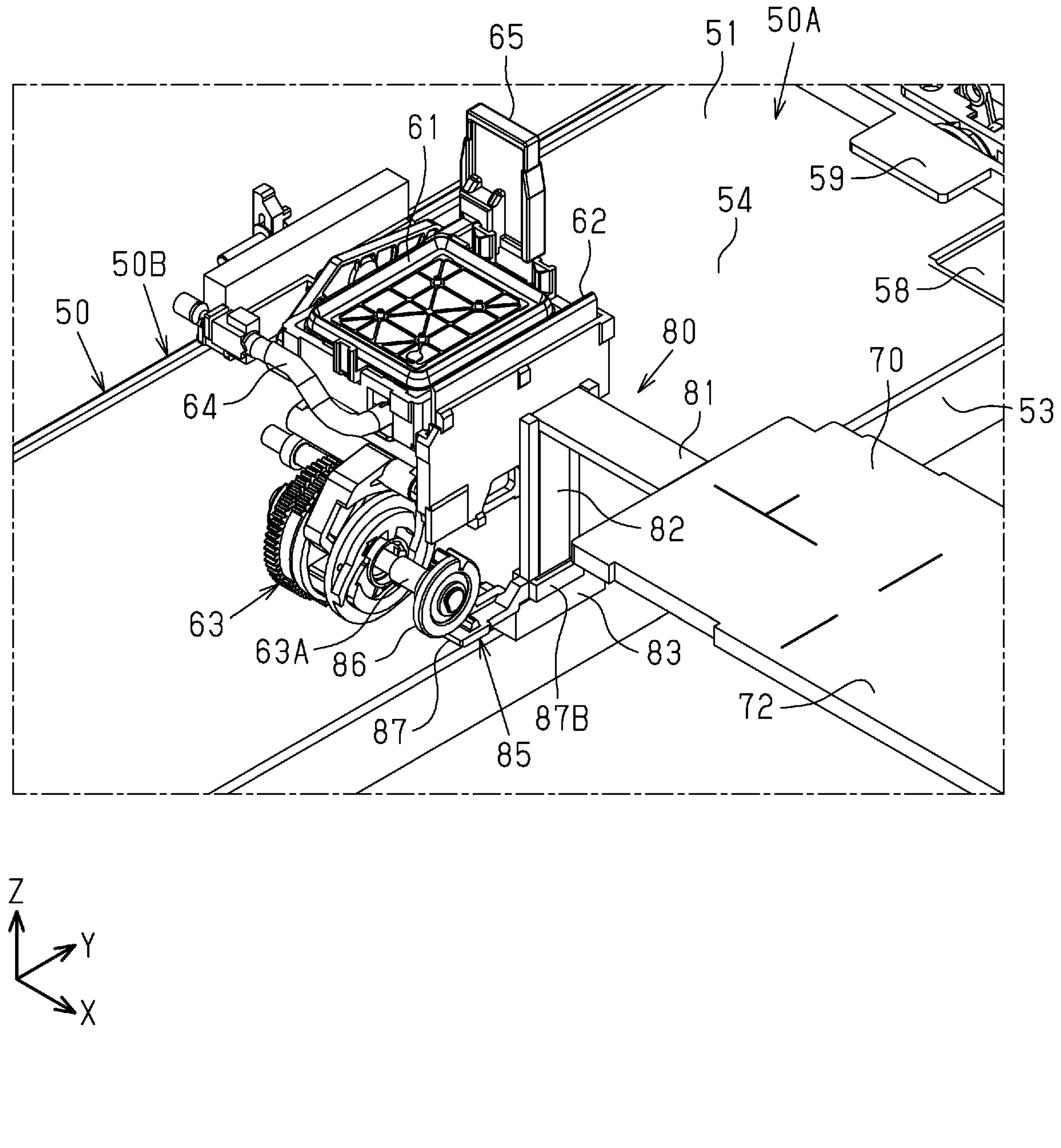
FIG. 14 is a perspective view illustrating the blocking mechanism that blocks the delivery of the waste liquid by the delivery mechanism.

As illustrated in FIG. 13, the intermittent gear 86 has an intermittent section 86A at a part in the peripheral direction thereof. When the intermittent gear 86 is rotated in a counterclockwise direction CCW in FIG. 13 by the power from the driving shaft 63B and the intermittent section 86A of the intermittent gear 86 and a fitting section 87A of the slide gear 87 are fitted to each other, the slide gear 87 moves to the front blocking position illustrated in FIG. 14. The slide gear 87 at the blocking position temporarily blocks the delivery of the waste liquid from the discard absorbing member 70 to the waste liquid absorbing member 50A. As illustrated in FIG. 13, the slide gear 87 has a storage section 87B, and a certain waste liquid amount can be stored in a recess portion 87C of the storage section 87B. When the slide gear 87 is at the blocking position, the storage section 87B is positioned between the second coupling absorbing member 82 and the waste liquid guide section 83, and the waste liquid dripping or flowing down from the lower end portion of the second coupling absorbing member 82 is stored in the storage section 87B. The volume of the storage section 87B is set to a value that does not overflow even when the waste liquid delivered from the discard absorbing member 70 is stored during the estimated time required for replacing the waste liquid box 50B. The waste liquid stored in the storage section 87B can be stored again by removing the waste liquid with an absorbent (not illustrated) or the like in a deliverable state.

With such a configuration, when the waste liquid collecting unit 50 is replaced, it is possible to suppress the dripping of the waste liquid downward from the second coupling absorbing member 82 and the contamination of the inside of the apparatus main body 12 with the waste liquid. Since the blocking operation of the blocking mechanism 85 is performed by using power of the existing driving source for driving the maintenance device 60, the cost of components can also be suppressed.

It is desirable that the blocking operation of the blocking mechanism 85 is performed in conjunction with various operations of the maintenance device 60 when the waste liquid collecting unit 50 is replaced. The blocking mechanism 85 is not a slide gear system, but the delivery mechanism 80 is a tube suction system that delivers the waste liquid by the suction force of the tube, and may be a blocking mechanism that blocks the delivery of the waste liquid by choking the tube using a choke mechanism.

Figure 15:
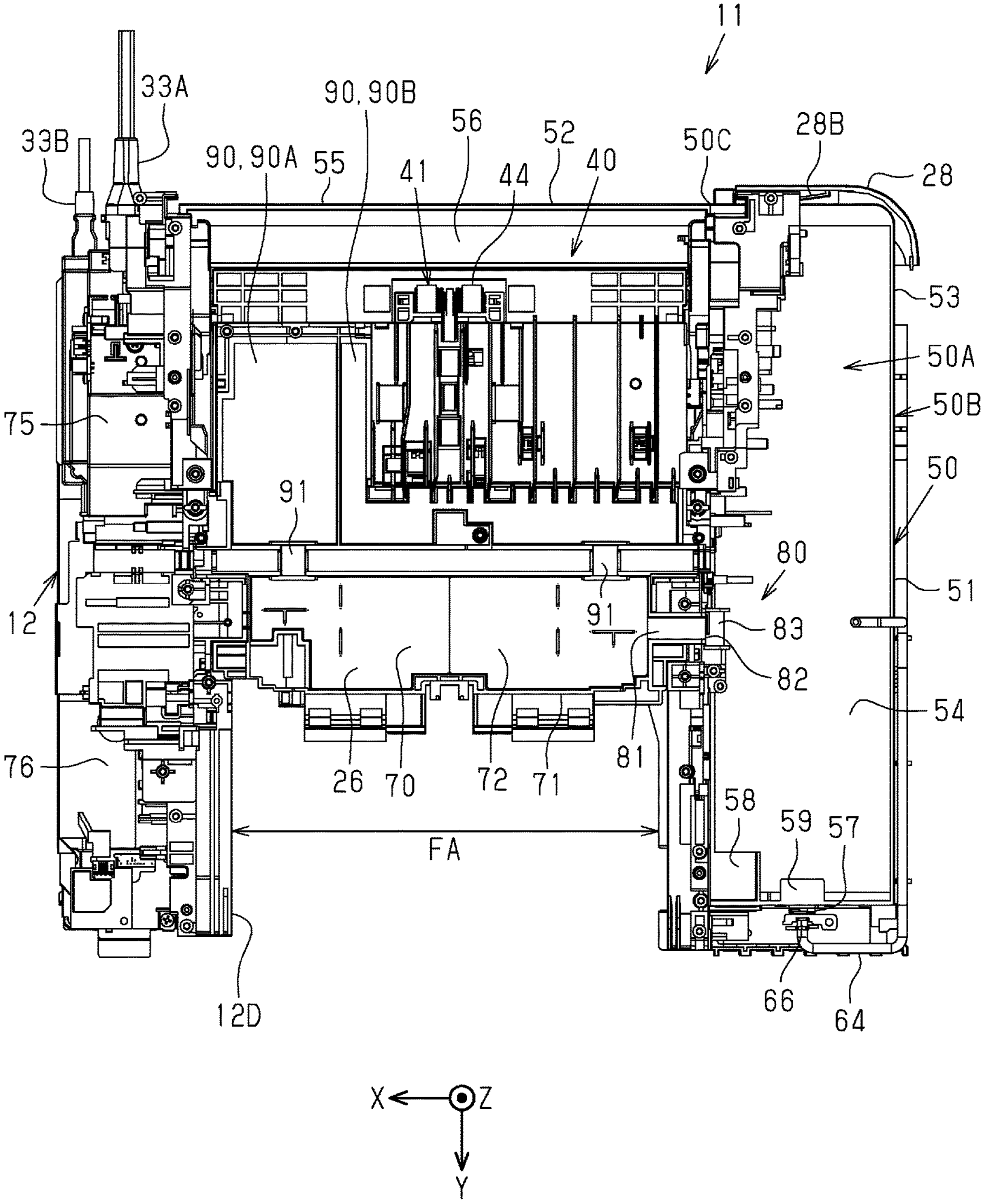
FIG. 15 is a plan view illustrating a part of the recording apparatus in a state where a waste liquid collection system is visible.

As illustrated in FIG. 15, the recording apparatus 11 includes a main substrate 76 on which the control section 100 that controls the discharge head 25 is mounted as an electronic component. The main substrate 76 is disposed in the accommodation space on the left side of the accommodation spaces on both sides of the transport region FA in the width direction X in the apparatus main body 12, similar to the power supply unit 75. Meanwhile, the waste liquid absorbing member 50A is inserted into the bottom portion of the accommodation space on the right side. The discard absorbing member 70 is disposed below the transport region FA together with the support section 26. Therefore, the waste liquid absorbing member 50A and the main substrate 76 are disposed facing each other with the discard absorbing member 70 sandwiched therebetween. In other words, the waste liquid absorbing member 50A and the main substrate 76 are disposed facing each other in the width direction X with the transport region FA, in which the discard absorbing member 70 is disposed, sandwiched therebetween. In this manner, the main substrate 76 is disposed at a position spaced apart from the waste liquid absorbing member 50A by a relatively long distance corresponding to the width dimension of the discard absorbing member 70, which is slightly longer than the width dimension of the transport region FA. Therefore, even when the waste liquid leaks from the waste liquid collecting unit 50, the possibility that the waste liquid comes into contact with the main substrate 76 is extremely low. The carriage 24 may be provided with the control section 100 that controls the discharge head 25. In this case, the electronic component may be a component other than the control section 100.

As illustrated in FIG. 15, the first waste liquid absorbing member 54 of the waste liquid absorbing member 50A is disposed at the right end portion of the recording apparatus 11 on the arrangement position side of the maintenance device 60 (refer to FIG. 6), and the joined section 57 to be joined to the joining section 66 serving as a waste liquid ejecting port from the maintenance device 60 is disposed on the front surface side of the recording apparatus 11. The waste liquid collecting unit 50 is attached to and detached from the back surface side of the recording apparatus 11.

As illustrated in FIG. 15, an extended absorbing member 90 is disposed in the apparatus main body 12 behind the discard absorbing member 70 on the upstream in the transport direction Y. In the example illustrated in FIG. 15, two extended absorbing members 90, such as a first extended absorbing member 90A and a second extended absorbing member 90B, are disposed. The first extended absorbing member 90A and the second extended absorbing member 90B are disposed side by side in the width direction X behind the discard absorbing member 70. Between the discard absorbing member 70 and the two extended absorbing members 90 are coupled to each other in a state where the flow of the waste liquid is possible via two coupling absorbing members 91. In other words, the discard absorbing member 70 is coupled to the first extended absorbing member 90A via one of the coupling absorbing members 91, and is coupled to the second extended absorbing member 90B via the other coupling absorbing member 91. By providing the extended absorbing member 90, the capacity of the waste liquid that can be absorbed by the absorbing member is increased per one recording apparatus.

As illustrated in FIG. 15, the recording apparatus 11 includes the extended absorbing member 90 which is coupled to the discard absorbing member 70 such that the liquid can be delivered. The discard absorbing member 70 and the waste liquid absorbing member 50A are disposed facing each other with the extended absorbing member 90 sandwiched therebetween at a position different from that of the delivery mechanism 80. Specifically, the discard absorbing member 70 and the second waste liquid absorbing member 56 that configures the waste liquid absorbing member 50A are disposed facing each other with the extended absorbing member 90 sandwiched therebetween at a position different from that of the delivery mechanism 80. Therefore, the capacity of the waste liquid that can be absorbed per one recording apparatus is increased, and the frequency of replacement of the waste liquid collecting unit 50 is reduced.

Figure 16:
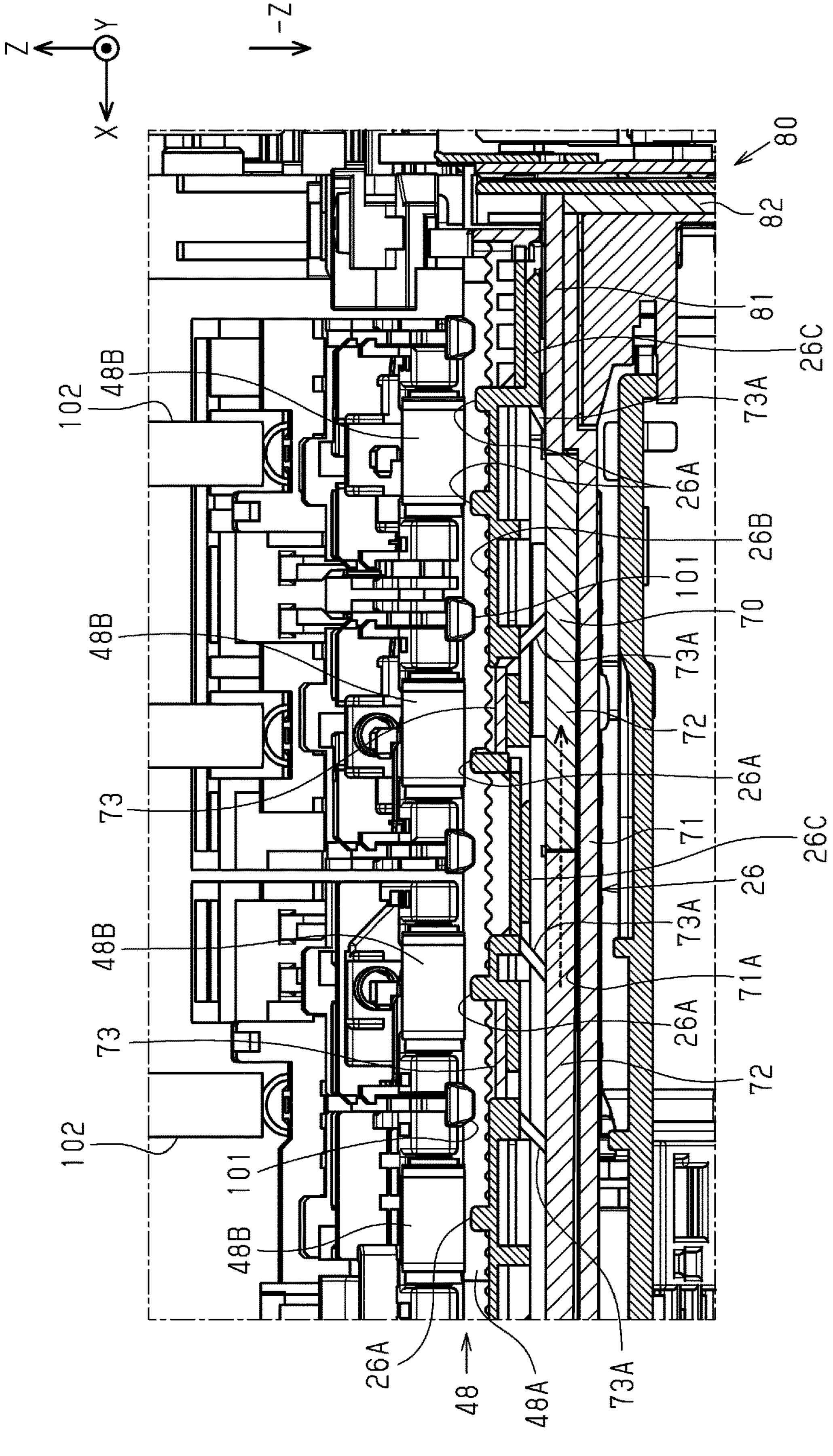
FIG. 16 is a front sectional view illustrating a part of a discard absorbing member taken along the line XVI-XVI of FIG. 6.

As illustrated in FIG. 16, the discard absorbing member 70 includes an accommodating section 71, a lower layer absorbing member 72 accommodated in the accommodating section 71, and a surface layer absorbing member 73 that partially covers a region other than the plurality of ribs 26A in the support section 26. The surface layer absorbing member 73 forms the surface layer of the discard absorbing member 70. The liquid discarded from the nozzle of the discharge head 25 to the outer side of the medium M lands on the surface layer absorbing member 73. Accordingly, the liquid discarded from the discharge head 25 is first absorbed by the surface layer absorbing member 73. In the support sections 26, a base portion 26C that supports the rib 26A has gaps at a plurality of points. The surface layer absorbing member 73 has a plurality of coupling sections 73A that extends obliquely downward. The plurality of coupling sections 73A extend obliquely downward through gaps at a plurality of points of the base portion 26C.

The coupling section 73A that extends obliquely downward from the surface layer absorbing member 73 is in contact with the lower layer absorbing member 72 that forms the lower layer of the discard absorbing member 70. At least the lower layer absorbing member 72 of the discard absorbing member 70 is supported by a bottom surface 71A of the accommodating section 71. The lower end portions of the plurality of coupling sections 73A are pressure-welded against the upper surface of the lower layer absorbing member 72. Therefore, the liquid discarded from the discharge head 25 to the discard absorbing member 70 is first absorbed by the surface layer absorbing member 73, and further permeates from the surface layer absorbing member 73 to the lower layer absorbing member 72 via the coupling section 73A. The permeation of the liquid through the coupling section 73A is performed by the action of the capillary phenomenon and gravity.

The bottom surface 71A of the accommodating section 71 that supports the discard absorbing member 70 is inclined downward toward the waste liquid absorbing member 50A. The slope of this inclination may be employed as long as the liquid flows toward the waste liquid absorbing member 50A. Therefore, the waste liquid that moved from the surface layer absorbing member 73 to the lower layer absorbing member 72 and accumulated in the lower layer absorbing member 72 flows through an inclined path that is inclined downward as approaching the waste liquid absorbing member 50A side along the bottom surface 71A, in a direction indicated by the broken line arrow in FIG. 16. In other words, the waste liquid accumulated at the bottom of the discard absorbing member 70 flows toward the delivery mechanism 80 along the inclination of the bottom surface 71A. Then, the waste liquid that flowed through the bottom of the discard absorbing member 70 and reached the delivery mechanism 80 flows to the waste liquid absorbing member 50A via the coupling absorbing members 81 and 82 and the slope 83A.

As illustrated in FIG. 16, the transport roller pair 48 includes a driving roller 48A and a plurality of driven rollers 48B. The driven roller 48B is urged by a coil spring 102 in a direction of approaching the driving roller 48A. The recording apparatus 11 includes a plurality of pressing members 101 that press the medium M, which is being transported, downward toward the support section 26. The distal end portions of the plurality of pressing members 101 are positioned facing a recess region 26B between the ribs 26A in the width direction X. The pressing member 101 is supported to be turnable around a turning fulcrum (not illustrated) and is urged in a gravity direction −Z by a spring (not illustrated). By pressing the surface of the medium M at a position between the ribs 26A in the width direction X by the plurality of pressing members 101, a wave shape rippling in the width direction X is formed in the medium M. Due to this wave shape, tension that extends in the transport direction Y is applied to the medium M, and curling of the distal end portion and the rear end portion of the medium M during recording is suppressed.

Figure 17:
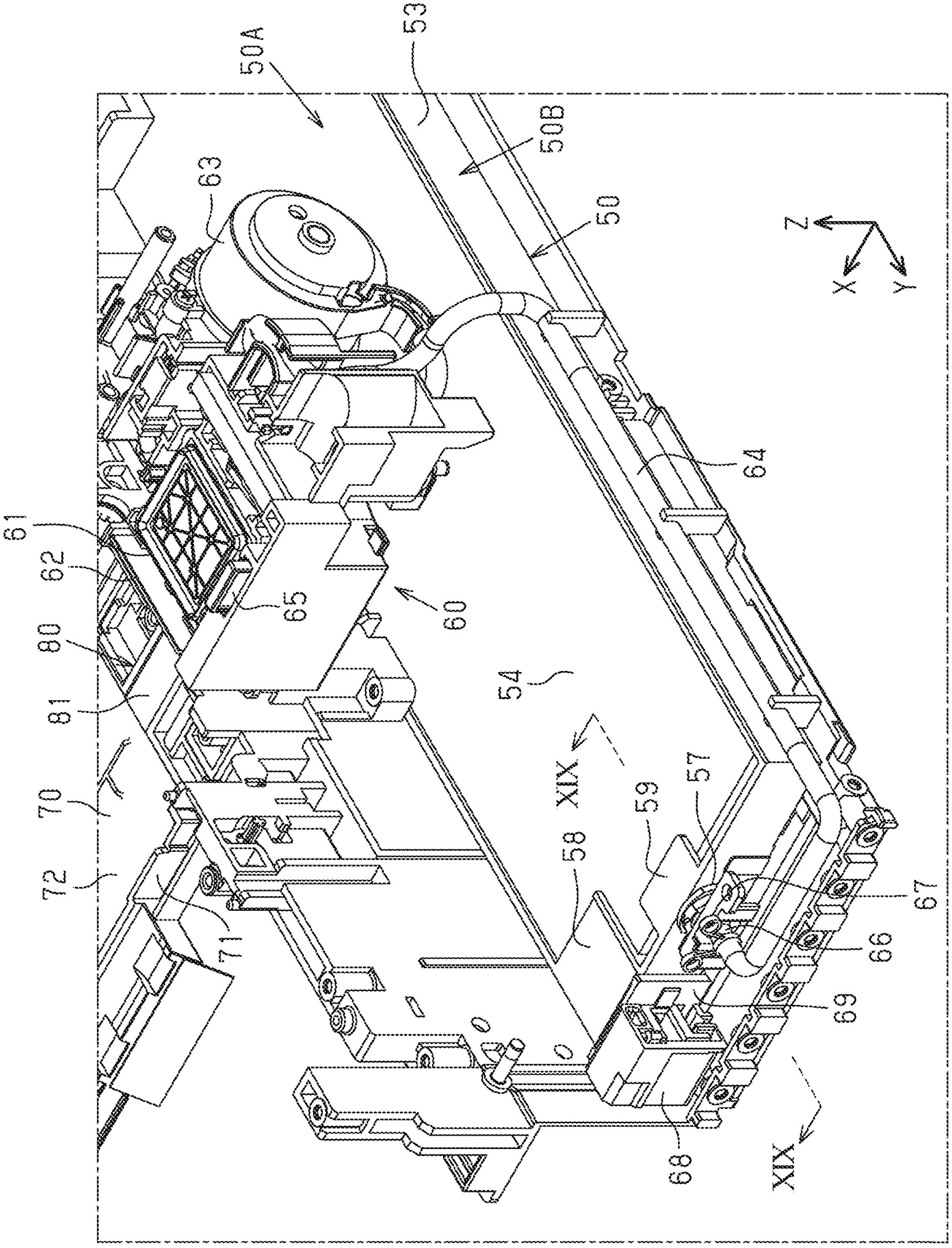
FIG. 17 is a perspective view illustrating a part of a maintenance device and the waste liquid collecting unit.

As illustrated in FIG. 17, the waste liquid box 50B that accommodates the waste liquid absorbing member 50A includes the joined section 57 that can be joined to the needle-shaped joining section 66 coupled to the distal end portion of the waste liquid tube 64 coupled to the maintenance device 60. The joining section 66 is fixed to the distal end portion of the waste liquid tube 64 via a clamp member 67. The waste liquid box 50B has the scattering prevention wall 59 above the distal end portion on the same side as the joined section 57. The waste liquid is carried from the suction pump 63 of the maintenance device 60 to the waste liquid absorbing member 50A in the waste liquid box 50B through the waste liquid tube 64. On the apparatus main body 12 side, a coupling terminal 69 supported by a coupling frame 68 is disposed at a position in the vicinity of the joining section 66. The storage element 58 coupled to the coupling terminal 69 is provided at a corner portion of the distal end portion of the waste liquid box 50B.

Figure 18:
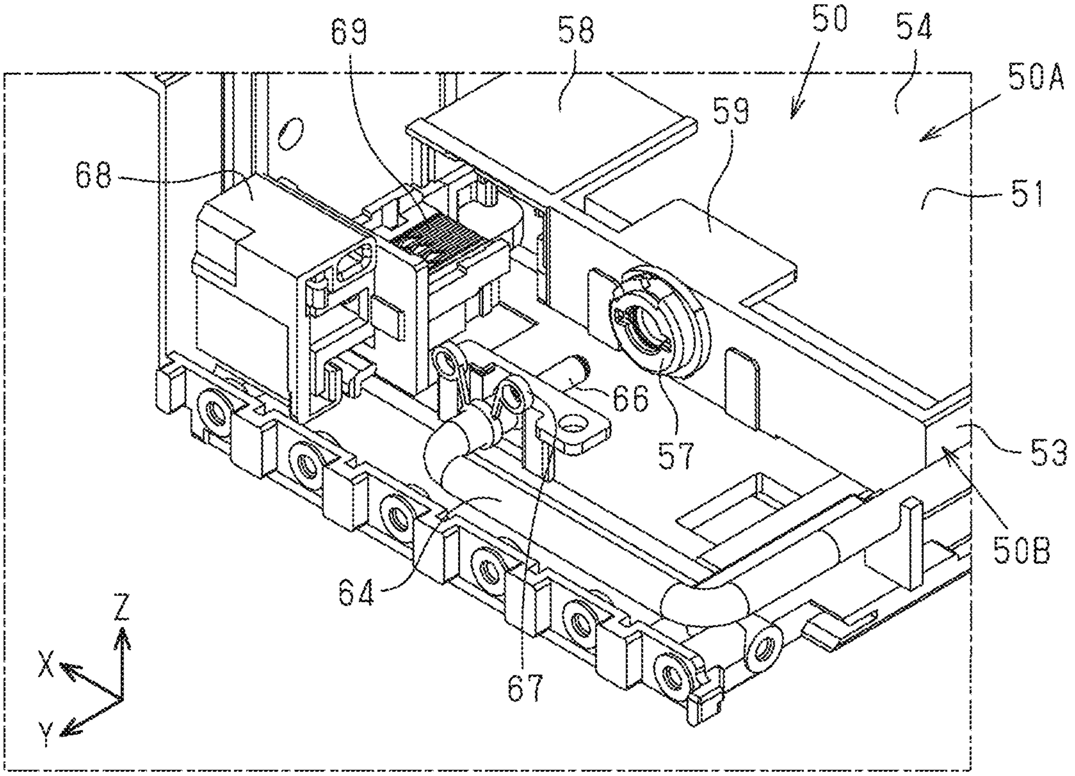
FIG. 18 is a perspective view illustrating a coupling section coupled to the apparatus main body side to which the waste liquid collecting unit is attached and detached.

FIG. 18 illustrates a state where the waste liquid box 50B is drawn out a little, and the coupling between the waste liquid box 50B and the needle-shaped joining section 66, and the electrical coupling between the coupling terminal 69 on the apparatus main body 12 side and the storage element 58 provided at the corner portion of the distal end portion of the waste liquid box 50B are released.

When the coupling between the coupling terminal 69 and the storage element 58 is released, at the distal end portion of the needle-shaped joining section 66 joined to the joined section of the waste liquid box 50B in a punctured state, there is a possibility that air bubbles or the like of the waste liquid such as waste ink remain. When the air bubbles burst, there is a possibility that the inside of the recording apparatus 11 is contaminated. Accordingly, by providing the scattering prevention wall 59 above the distal end portion of the waste liquid box 50B, contamination due to the bursting of air bubbles is prevented.

Figure 19:
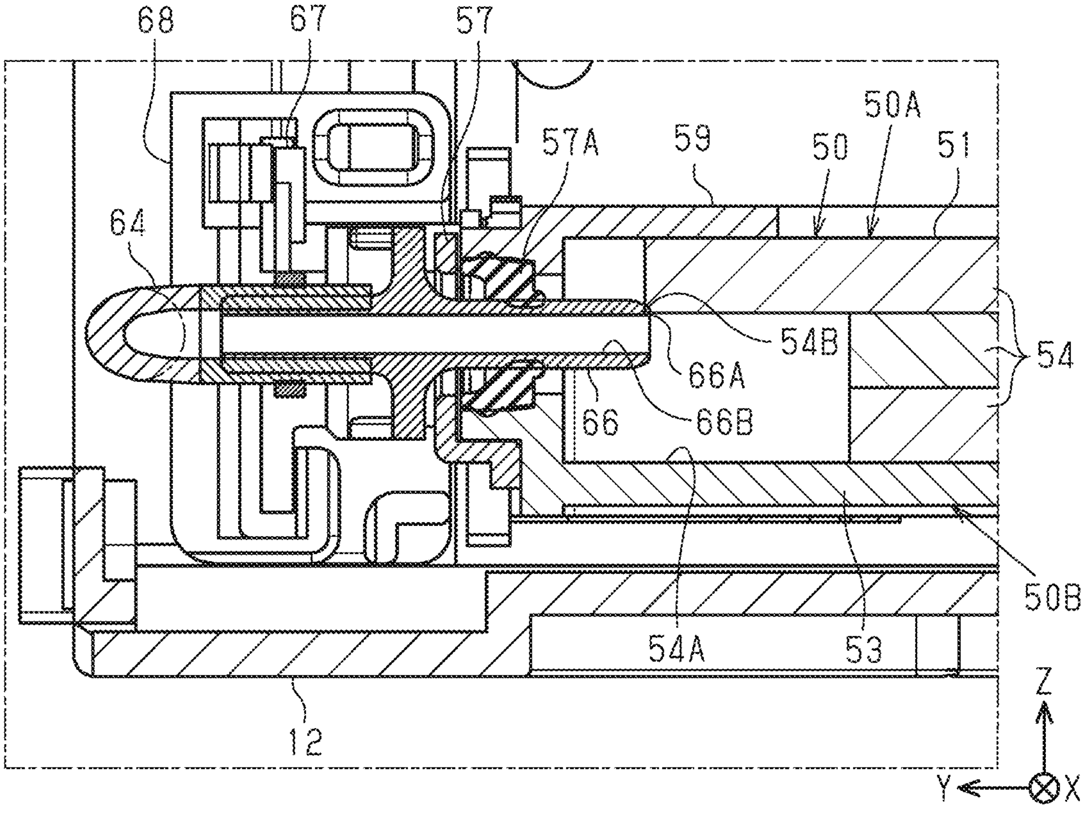
FIG. 19 is a side sectional view illustrating a periphery of a joint point between the waste liquid collecting unit and a joining section taken along the line XIX-XIX of FIG. 17.

As illustrated in FIG. 19, the scattering prevention wall 59 has a part which is at the same position in the transport direction Y (depth direction) as the waste liquid absorbing member 50A, and overlaps the waste liquid absorbing member 50A in the vertical direction Z. Therefore, the scattering prevention wall 59 also has a function of preventing the waste liquid absorbing member 50A from coming off upward.

As illustrated in FIG. 19, the needle-shaped joining section 66 is in a state of being joined to the joined section 57 in a state where a part on the distal end side is inserted into the waste liquid box 50B through a rubber seal 57A. The waste liquid absorbing member 50A is configured by stacking a plurality (for example, three) of first waste liquid absorbing members 54 in the vertical direction Z, the distal end 54B of the top one of the plurality of these members extends to be close to the joined section 57, and the distal ends of the other two members are positioned to be more separated from the joined section 57 than the top one. Due to the stepped shape of the distal end portions of the plurality of first waste liquid absorbing members 54, a space section 54A is formed inside the end portion of the waste liquid box 50B on the joined section 57 side.

Then, as illustrated in FIG. 19, a distal end 66A of the needle-shaped joining section 66 joined to the joined section 57 is partially in contact with the waste liquid absorbing member 50A. In other words, the distal end 66A of the needle-shaped joining section 66 joined to the joined section 57 of the waste liquid box 50B is in contact with a part of the waste liquid absorbing member 50A to the extent that a waste liquid flow path 66B of the joining section 66 is not blocked. Specifically, the corner portion of one distal end 54B positioned at the top of the plurality of first waste liquid absorbing members 54 that configures the waste liquid absorbing member 50A is in contact with the distal end 66A of the joining section 66 in a joined state. Since the above-described space section 54A is formed, the distal end 66A of the joining section 66 is in contact with the distal end 54B of the first waste liquid absorbing member 54 in a state close to point contact. Accordingly, the generation of air bubbles in the waste liquid when the waste liquid box 50B is attached and detached is suppressed. In a state where the distal end 66A of the joining section 66 is in contact with the first waste liquid absorbing member 54 in a state of blocking the waste liquid flow path 66B, when the waste liquid box 50B is removed, there is a case where air bubbles are generated by the waste liquid existing during the process of separating the distal end 66A of the joining section 66 and the first waste liquid absorbing member 54 from each other. When the air bubbles burst, the waste liquid scatters and contaminates the inside of the recording apparatus 11. On the other hand, in this embodiment, the distal end 66A of the joining section 66 is partially in contact with the waste liquid absorbing member 50A, and is not in contact with the waste liquid absorbing member 50A in a state where the waste liquid flow path 66B is blocked. Therefore, when the waste liquid box 50B is removed, air bubbles are less likely to be generated in the process of separating the distal end 66A of the joining section 66 and the first waste liquid absorbing member 54 from each other. Therefore, contamination in the recording apparatus 11 due to the bursting of air bubbles when the waste liquid box 50B is attached and detached is suppressed.

Figure 20:
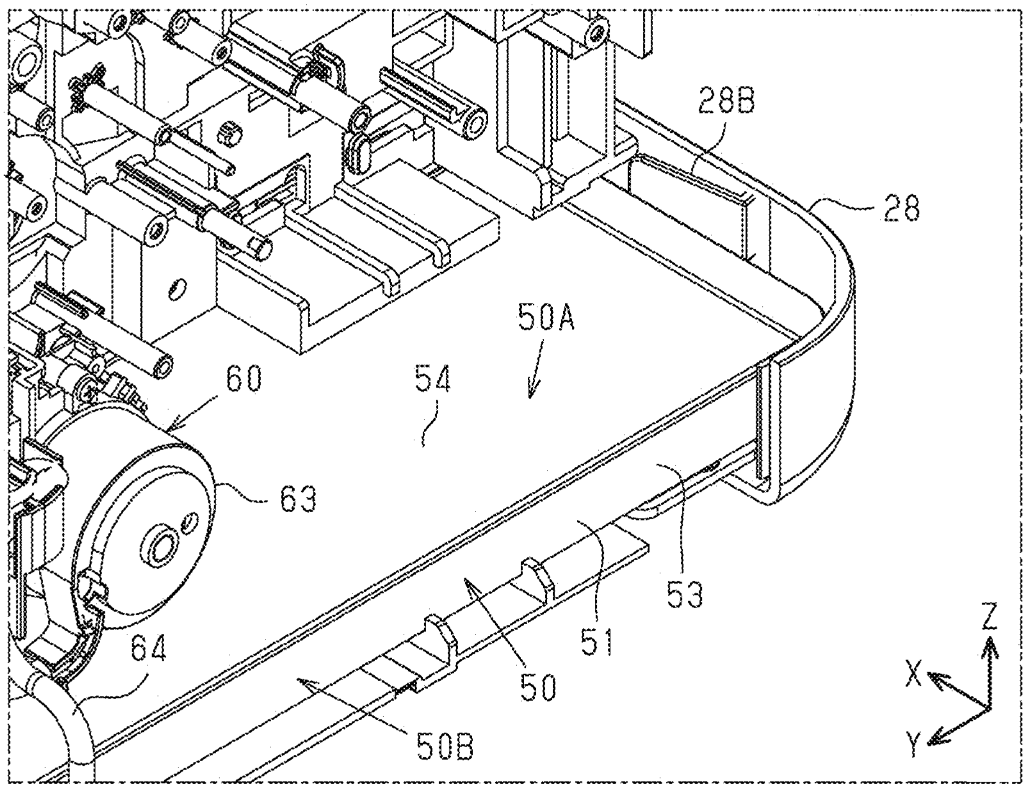
FIG. 20 is a partial perspective view illustrating a mechanism for urging the waste liquid collecting unit in a pushing direction.

As illustrated in FIG. 20, between the waste liquid box 50B inserted into the apparatus main body 12 and the waste liquid box cover 28 which is an example of a cover that covers the waste liquid box 50B, a leaf spring 28B is provided as an example of an urging member that urges the waste liquid box 50B in the insertion direction when the waste liquid box cover 28 is closed. In other words, the leaf spring 28B is provided in the waste liquid box cover 28, and the waste liquid box 50B is urged in front of the recording apparatus 11, that is, in the transport direction Y. With this structure, unless the screw 28A of the waste liquid box cover 28 illustrated in FIG. 5 is fastened, the waste liquid box cover 28 turns and remains open, and thus, the user can easily recognize that the waste liquid box 50B is not sufficiently pushed and in a half-inserted state.

In the example illustrated in FIG. 20, the leaf spring 28B is used, but a torsion spring or a compression spring may be used. In a case where it is detected that the coupling terminal 69 and the storage element 58 are not coupled to each other at the time of half-insertion, the liquid suction operation of the maintenance device 60 is prohibited, and error notification of a half-inserted state may be given on the display section 14 or the display section of the host device. Furthermore, a sensor for detecting the movement of the waste liquid box 50B or the waste liquid box cover 28 is provided, and when the half-inserted state of the waste liquid box 50B is detected, the liquid suction operation of the maintenance device 60 is prohibited, and error notification of the half-inserted state may be given on the display section 14 or the display section of a host device.

Electrical Configuration of Recording Apparatus

Next, an electrical configuration of the recording apparatus 11 will be described. The recording apparatus 11 is coupled to the host device (not illustrated) to be capable of communicating therewith. The control section 100 performs recording control based on the recorded data received from the host device. The host device is configured with, for example, any one of a personal computer, a personal digital assistant (PDA), a tablet PC, a smartphone, a mobile phone, and the like.

The control section 100 performs various controls including recording control with respect to the recording apparatus 11. The control section 100 includes one or more processors that operate according to a computer program (software). The processor includes a CPU and a memory such as a RAM and a ROM, and the memory stores a program code or a command configured to cause the CPU to execute processing. The control section 100 is not limited to the one that performs software processing. For example, the control section 100 may include a dedicated hardware circuit (for example, an integrated circuit for a specific application: ASIC) that performs hardware processing for at least a part of the processing executed by itself.

The discharge head 25, the feeding motor, the transport motor, the carriage motor 36, and the like are electrically coupled to the control section 100 as output systems. The control section 100 controls the discharge head 25, the feeding motor, the transport motor, the carriage motor 36, and the like. A medium detector, the linear encoder 37, a rotary encoder, and the like are electrically coupled to the control section 100 as input systems.

The control section 100 feeds the medium M from the cassette 20 or the feeding tray 22 by controlling the first feeding section 41 or the second feeding section 42. The control section 100 controls the transport of the medium M by the roller pairs 48 and 49 by driving and controlling the transport motor. The control section 100 uses a position detected by the medium detector as the origin, for example, and counts the pulse edge of the pulse signal input from the rotary encoder by a counter (not illustrated) to acquire the transport position of the medium M.

In the control section 100, the carriage 24 uses a position when the carriage 24 reaches the home position HP as the origin, and counts the number of pulse edges of the detection signal input from the linear encoder 37 by a counter (not illustrated) to acquire the carriage position which is a position in the scanning direction X with respect to the origin position of the carriage 24. The control section 100 controls the carriage motor 36 based on the counted value of the carriage position, and accordingly, the speed control and the position control of the carriage 24 are performed. Furthermore, the control section 100 controls the discharge timing of discharging the liquid from the nozzle of the discharge head 25 based on the recorded data. Accordingly, the discharge head 25 records an image based on the recorded data on the medium M.

In a case where double-sided recording is instructed, first, when performing the recording on the first surface of the medium M, the control section 100 drives the transport motor in the forward direction to drive the roller pairs 48 and 49 in the forward direction, and thereby transports the medium M in the transport direction Y. During this transport, the recording section 23 records an image or the like on the first surface of the medium M. When the recording on the first surface of the medium M is finished, the control section 100 drives the transport motor in the reverse direction to drive the roller pairs 48 and 49 in the reverse direction, and thereby transports the medium M reversely toward the upstream in the transport direction Y. The reversely transported medium M is reversed in a direction in which the second surface opposite to the first surface becomes the recording surface which is a recording target via the reversing roller 47, and the reversed medium M is fed again in the transport direction Y.

The control section 100 measures or calculates the liquid amount discharged and ejected from the discharge head 25 based on the recorded data and maintenance information, and adds the measured or calculated liquid amount to the value of the waste liquid amount read from the storage element 58, and accordingly, the current waste liquid amount of the waste liquid collecting unit 50 is updated. The control section 100 updates the latest waste liquid amount of the waste liquid collecting unit 50 by writing the waste liquid amount to the storage element 58 periodically or irregularly. When the waste liquid amount of the waste liquid collecting unit 50 reaches the upper limit value, the control section 100 notifies the user by displaying a message indicating that the replacement time is reached and promoting the replacement on the display section 14 or the display section of the host device, and thereby promotes the user to replace the waste liquid collecting unit 50.

Next, the operation of the recording apparatus 11 will be described.

When the user selects the edgeless recording mode and instructs the start of recording, the medium M fed from the cassette 20 or the medium M placed on the feeding tray 22 is fed. The fed medium M is transported to the recording region by the rotation of the roller pairs 48 and 49. By alternately performing the recording operation in which the discharge head 25 discharges the liquid toward the medium M while the recording section 23 moves in the scanning direction X and the recording is performed by one scanning, and the transport operation in which the medium M is transported by the roller pairs 48 and 49 to the next recording position, the recording on the medium M is performed.

For example, in the edgeless recording mode, the discharge head 25 that moves in the scanning direction X together with the recording section 23 discharges the liquid to a region that protrudes to the outer side of from the side end of the medium M in the width direction X. At this time, the liquid discharged from the discharge head 25 to the outer side from the side end of the medium M in the width direction X is discarded by the discard absorbing member 70 that covers a part of the surface of the support section 26. The discarded liquid is absorbed as a waste liquid by the discard absorbing member 70 illustrated in FIGS. 1 and 6. Specifically, the discarded liquid is absorbed by the surface layer absorbing member 73 disposed on the surface side of the discard absorbing member 70. In this manner, during recording, the liquid discarded from the discharge head 25 is absorbed as a waste liquid by the discard absorbing member 70, and the waste liquid gradually accumulates in the discard absorbing member 70.

During recording, the recording section 23 periodically moves to the home position HP and performs idle discharge (flushing) in which the liquid is discharged from all of the nozzles of the discharge head 25 toward the cap 61. The idle discharge prevents the nozzle of the discharge head 25 during recording from being clogged. The liquid (waste liquid) accumulated in the cap 61 due to idle discharge is collected in the waste liquid box 50B through the waste liquid tube 64 by driving the suction pump 63. The waste liquid sent through the waste liquid tube 64 is collected in the waste liquid box 50B via the joining between the joining section 66 and the joined section 57, and is absorbed by the waste liquid absorbing member 50A held in the waste liquid box 50B.

When the cleaning time comes, the cleaning in which the maintenance device 60 forcibly ejects the liquid from the nozzle of the discharge head 25 is performed. Cleaning prevents or eliminates clogging of the nozzle of the discharge head 25. Specifically, the recording section 23 is in a capping state where the cap 61 is in contact with the nozzle surface of the discharge head 25 at the home position HP. By driving the suction pump 63 under this capping state, the closed space surrounded by the nozzle surface and the cap 61 becomes a negative pressure. As a result, the liquid is forcibly ejected from the nozzle of the discharge head 25. The ejected liquid is received by the cap 61 and is collected from the cap 61 into the waste liquid collecting unit 50 through the waste liquid tube 64 by the negative pressure of the suction pump 63.

The joining section 66 fixed to the distal end portion of the waste liquid tube 64 is in a state of being joined to the joined section 57 of the waste liquid box 50B. The waste liquid sent through the waste liquid tube 64 is collected in the waste liquid box 50B. The waste liquid collected in the waste liquid box 50B is absorbed by the first waste liquid absorbing member 54. The waste liquid absorbed by the first waste liquid absorbing member 54 is delivered to the second waste liquid absorbing member 56 due to the capillary phenomenon or the like.

Meanwhile, the liquid discarded to the discard absorbing member 70 accumulates in the discard absorbing member 70 as a waste liquid. The waste liquid accumulated in the discard absorbing member 70 moves in the direction indicated by the broken line arrow in FIG. 16 due to the slight slope of the bottom surface 71A. The waste liquid that moved to the end portion in the discard absorbing member 70 flows to the waste liquid absorbing member 50A via the delivery mechanism 80 due to the capillary phenomenon, gravity, or the like. Since the delivery mechanism 80 is in the non-blocking position (retracted position) illustrated in FIG. 12, the waste liquid that flows via the coupling absorbing members 81 and 82 drips or flows down from the lower end of the second coupling absorbing member 82, and further flows down on the slope 83A of the waste liquid guide section 83, and thereby reaches the waste liquid absorbing member 50A. Then, the waste liquid that reached the waste liquid absorbing member 50A is absorbed by the waste liquid absorbing member 50A.

In this manner, when the amount of the waste liquid absorbed by the discard absorbing member 70 exceeds a certain amount, the waste liquid flows from the discard absorbing member 70 to the waste liquid absorbing member 50A via the delivery mechanism 80. Accordingly, the discard absorbing member 70 is always held in a state where the waste liquid can be absorbed without overflowing the waste liquid. The waste liquid absorbed by the discard absorbing member 70 flows to the waste liquid absorbing member 50A positioned lower than the discard absorbing member 70 via the delivery mechanism 80 by gravity.

Further, when the waste liquid amount that flows from the discard absorbing member 70 to the waste liquid absorbing member 50A via the delivery mechanism 80 is small for the waste liquid amount discarded to the discard absorbing member 70, the waste liquid accumulates a little excessively in the discard absorbing member 70. In this case, the waste liquid accumulated in the discard absorbing member 70 temporarily flows to the extended absorbing member 90 (90A, 90B) via the coupling absorbing member 91. Therefore, the frequency with which the waste liquid excessively accumulates in the discard absorbing member 70, even temporarily, is reduced. After this, even when the recording on the medium M is finished and the liquid is not discarded to the discard absorbing member 70, the waste liquid is continuously delivered via the delivery mechanism 80, and thus, the amount of the waste liquid gradually accumulated in the discard absorbing member 70 is also reduced. Then, the waste liquid that temporarily flows to the extended absorbing member 90 returns to the discard absorbing member 70 via the coupling absorbing member 91 again, and in a case where the waste liquid accumulated in the discard absorbing member 70 due to the returned waste liquid seems to be excessive, the waste liquid continues to flow from the discard absorbing member 70 to the waste liquid absorbing member 50A via the delivery mechanism 80. In this manner, even when the liquid amount discarded to the discard absorbing member 70 per unit time is large, the discard absorbing member 70 is held in a state where the liquid can be absorbed.

Then, in the recording apparatus 11, when the waste liquid collecting unit 50 is filled with the waste liquid due to the waste liquid ejected by recording, idle discharge, cleaning, or the like, the user replaces the waste liquid collecting unit 50 with a new waste liquid collecting unit 50.

The control section 100 manages the waste liquid amount collected by the waste liquid collecting unit 50. When the waste liquid amount exceeds the upper limit value, the control section 100 displays a message on the display section 14 or the display section of the host computer indicating that it is time to replace the waste liquid collecting unit 50. When the waste liquid amount exceeds the upper limit value in the waste liquid collecting unit 50, the control section 100 displays a message on the display section 14 or the display section of the host device indicating that it is time to replace the waste liquid collecting unit 50. The user who sees this message notifies the recording apparatus 11 that the waste liquid collecting unit 50 is to be replaced, by operating the touch panel of the display section 14 or the input section of the host device.

When the control section 100 receives an instruction to replace the waste liquid collecting unit 50, the control section 100 drives the transport motor to move the slide gear 87 from the retracted position to the blocking position. By disposing the slide gear 87 at the blocking position, the delivery path of the waste liquid via the delivery mechanism 80 is blocked.

As illustrated in FIG. 3, the user slides the feeding tray 22 and the support guide member 27 upward to expose a part of the waste liquid collecting unit 50 from the opening 12C at the lower portion of the back surface of the apparatus main body 12. Furthermore, as illustrated in FIG. 4, the user removes the screw 28A and opens the waste liquid box cover 28 from the closed position to the open position.

Then, the user draws out the waste liquid collecting unit 50 to the upstream in the transport direction Y and removes the waste liquid collecting unit 50 from the apparatus main body 12. After this, the new waste liquid collecting unit 50 is pushed in while sliding from the opening 12C in the transport direction Y (pushing direction). By this pushing, the joining section 66 is joined to the joined section 57 of the waste liquid box 50B. In this manner, the waste liquid box 50B is coupled to the waste liquid tube 64. At this time, the coupling terminal 69 is electrically coupled to the storage element 58.

An updated value of the waste liquid amount collected in the waste liquid collecting unit 50 managed by the control section 100 is written in the storage element 58.

The control section 100 measures the liquid amount collected by the waste liquid collecting unit 50, such as the liquid amount discharged from the nozzle of the discharge head 25 at the time of idle discharge and the liquid amount ejected from the nozzle at the time of cleaning. The measured liquid amount is written in the storage element 58 provided in the waste liquid box 50B at a predetermined timing. Therefore, even when the waste liquid collecting unit 50 is replaced, the control section 100 can acquire the waste liquid amount collected in the waste liquid collecting unit 50 by reading the data stored in the storage element 58.

According to the above-described first embodiment, the following effects can be obtained.

(1) The recording apparatus 11 which is an example of a liquid discharge apparatus includes: the discharge head 25 that discharges a liquid to the medium M which is an example of a recording material; the support section 26 provided facing the discharge head 25 and supporting the medium M from below; and the discard absorbing member 70 which is an example of a first absorbing member that absorbs the liquid discarded from the discharge head 25 to an outer side of an end portion of the medium M supported by the support section 26, as a waste liquid. Furthermore, the recording apparatus 11 includes: the cap 61 which is an example of a waste liquid receiving section that receives the liquid ejected from the discharge head 25 as a waste liquid; the waste liquid absorbing member 50A which is an example of a second absorbing member that absorbs the waste liquid sent from the cap 61; and the waste liquid box 50B which is an example of an accommodating section that holds the waste liquid absorbing member 50A. The discard absorbing member 70 and the waste liquid absorbing member 50A are coupled to each other such that the waste liquid can be delivered from the discard absorbing member 70 to the waste liquid absorbing member 50A.

Accordingly, the liquid (waste liquid) discarded from the discharge head 25 to the outside of the end portion of the medium M supported by the support section 26 is absorbed by the discard absorbing member 70. The waste liquid absorbed by the discard absorbing member 70 is delivered from the discard absorbing member 70 to the waste liquid absorbing member 50A. At the time of replacement, it is sufficient to replace the waste liquid box 50B that holds the waste liquid absorbing member 50A, which is a part of the discard absorbing member 70 and the waste liquid absorbing member 50A. Accordingly, it is easy to replace the absorbing member, and it is possible to suppress the contamination of the recording apparatus 11 or the hand of the worker due to the waste liquid absorbed by the absorbing member at the time of replacement. Even when the user is not a service person, the general user can replace the waste liquid absorbing member 50A by himself or herself, and thus, the usability of the recording apparatus is improved.

(2) The waste liquid absorbing member 50A is positioned lower than the discard absorbing member 70. Accordingly, the liquid can be delivered from the discard absorbing member 70 to the waste liquid absorbing member 50A by using gravity. For example, even when the waste liquid absorbing member 50A is replaced, it is possible to avoid a situation in which a large waste liquid amount remains in the discard absorbing member 70 and is not collected. The pump and the driving section thereof can be eliminated for the delivery of the liquid, and even when a pump or the like is provided, a small size can be achieved. Therefore, the liquid can be efficiently delivered from the discard absorbing member 70 to the waste liquid absorbing member 50A.

(3) The recording apparatus 11 includes the delivery mechanism 80 which is an example of a delivery section that delivers the liquid between the discard absorbing member 70 and the waste liquid absorbing member 50A. Accordingly, even when the discard absorbing member 70 and the waste liquid absorbing member 50A are separated from each other, the waste liquid can be delivered via the delivery mechanism 80. For example, since the waste liquid box 50B has a shape or position that makes attachment to and detachment and from the apparatus main body 12 easy, there is a case where the waste liquid absorbing member 50A has a shape or position that makes it difficult for the waste liquid absorbing member 50A to come into contact with the discard absorbing member 70. In this case, when it becomes difficult to deliver the liquid, it is necessary to replace the discard absorbing member and the waste liquid absorbing member 50A separately. In this case, when only the waste liquid box 50B that holds the waste liquid absorbing member 50A is replaced, a large liquid amount remains in the discard absorbing member 70. On the other hand, according to this embodiment having the delivery mechanism 80, even when the waste liquid box 50B has a shape that is easily attached to and detached from the apparatus main body 12 or is disposed at a position that makes attachment to and detachment and from the apparatus main body 12 easy, the liquid can be delivered from the discard absorbing member 70 to the waste liquid absorbing member 50A via the delivery mechanism 80. Therefore, for example, even when the waste liquid box 50B is replaced, it is possible to avoid a situation in which a large liquid amount remains in the discard absorbing member 70. In other words, it is sufficient to replace the waste liquid box 50B that holds the waste liquid absorbing member 50A.

(4) The recording apparatus 11 may include the blocking mechanism 85 capable of temporarily blocking the delivery of liquid by the delivery mechanism 80 between the discard absorbing member 70 and the waste liquid absorbing member 50A. Accordingly, when the waste liquid box 50B is replaced, the blocking mechanism 85 is capable of temporarily blocking the delivery of the liquid by the delivery mechanism 80 from the discard absorbing member 70 to the waste liquid absorbing member 50A, and thus, even when the waste liquid absorbing member 50A is disconnected from the discard absorbing member 70, it is possible to suppress the leakage of the waste liquid delivered from the discard absorbing member 70 into the apparatus main body 12 and the contamination of the inside of the recording apparatus 11 with the waste liquid.

(5) The blocking mechanism 85 is driven by using power of the maintenance device 60 and temporarily blocks the delivery of the liquid. Accordingly, since the blocking mechanism 85 is driven by using power of the maintenance device 60, it is not necessary for the user to manually switch the blocking mechanism 85 between blocking and coupling. For example, when the user operates the operation switch, it is possible to switch the blocking mechanism 85 between the blocking and coupling by using power of the maintenance device 60.

(6) The delivery mechanism 80 is configured to be capable of delivering the liquid in a state where the waste liquid box 50B is inserted into the apparatus main body 12. Therefore, in a state where the waste liquid box 50B is inserted into the apparatus main body 12, the delivery mechanism 80 can deliver the liquid between the discard absorbing member 70 and the waste liquid absorbing member 50A. Accordingly, the waste liquid absorption efficiency of the entire absorbing member can be improved.

(7) The main substrate 76 on which the electronic components are mounted and the waste liquid absorbing member 50A are disposed facing each other with the discard absorbing member 70 sandwiched therebetween. In other words, the main substrate 76 and the waste liquid absorbing member 50A are disposed facing each other in the width direction X with the transport region FA, in which the discard absorbing member 70 is positioned, sandwiched therebetween. The main substrate 76 and the waste liquid absorbing member 50A are disposed respectively at positions spaced apart from each other by a distance corresponding to the width dimension of the discard absorbing member 70. Accordingly, even when the waste liquid leaks from the waste liquid absorbing member 50A, it is unlikely that the leaked waste liquid crosses the transport region FA, reaches the main substrate 76, and comes into contact with the main substrate 76. For example, it is possible to suppress the contact of the waste liquid that leaked from the waste liquid absorbing member 50A with the main substrate 76 and occurrence of an electrical failure. The discard absorbing member 70 is positioned closer to the main substrate 76 than the waste liquid absorbing member 50A, but since the absorbed liquid amount is smaller than that of the waste liquid absorbing member 50A, even when the waste liquid leaks from the discard absorbing member 70, the waste liquid does not easily come into contact with the main substrate 76.

(8) The recording apparatus 11 includes the extended absorbing member 90 which is coupled to the discard absorbing member 70 such that the liquid can be delivered. The discard absorbing member 70 and the waste liquid absorbing member 50A are disposed facing each other with the extended absorbing member 90 sandwiched therebetween at a position different from that of the delivery mechanism 80. Accordingly, since the waste liquid absorption accommodation amount of the entire absorbing member per one recording apparatus is increased, the replacement frequency of the waste liquid absorbing member 50A can be reduced. In the space between the discard absorbing member 70 and the waste liquid absorbing member 50A, a part which is not occupied by the delivery mechanism 80 is used, and thus, it is easy to ensure a relatively large volume for the extended absorbing member.

(9) The recording apparatus 11 includes the liquid supply source 17 that supplies the liquid to the discharge head 25, and the maintenance device 60 that forcibly ejects the liquid from the discharge head 25 to the cap 61. The waste liquid absorbing member 50A is disposed below the maintenance device 60 or the liquid supply source 17. Accordingly, the waste liquid that fell downward from the maintenance device 60 when cleaning the discharge head 25, or the waste liquid that fell when the liquid supply source 17 is replaced or when the liquid is replenished to the liquid supply source 17, can be absorbed by the waste liquid absorbing member 50A. Therefore, the contamination of the waste liquid in the recording apparatus 11 can be suppressed.

(10) The waste liquid absorbing member 50A has a function of absorbing the liquid scattered from the maintenance device 60 or the liquid supply source 17. Therefore, the liquid scattered from the maintenance device 60 or the liquid supply source 17 can be absorbed by the waste liquid absorbing member 50A. Therefore, the contamination of the waste liquid in the recording apparatus 11 can be suppressed.

(11) The waste liquid absorbing member 50A is disposed so as to partially overlap below the first feeding section 41 that feeds the media M accommodated in the cassette 20 positioned below the discharge head 25 one by one toward the recording position of the discharge head 25. Accordingly, the size of the recording apparatus 11 can be reduced.

(12) The waste liquid absorbing member 50A is disposed so as to overlap below the second feeding section 42 that feeds the medium M placed on the feeding tray 22, which is an example of a placement section, toward the recording position of the discharge head 25. Accordingly, the size of the recording apparatus 11 can be reduced.

(13) The recording apparatus 11 includes the reversing roller 47 which is an example of a reversing section that reverses the medium M, on which the recording is finished on the first surface by the discharge head 25 and which is switched back and transported further to the upstream of the discharge head 25 in the transport direction Y, such that the second surface which is an example of a surface opposite to the first surface can face the discharge head 25. The waste liquid absorbing member 50A is disposed so as to partially overlap below the reversing roller 47. Accordingly, the size of the recording apparatus 11 can be reduced.

(14) The recording apparatus 11 includes the power supply unit 75 that supplies electric power to the discharge head 25. The waste liquid absorbing member 50A and the power supply unit 75 are disposed facing each other with the discard absorbing member 70 sandwiched therebetween. Since the waste liquid absorbing member 50A and the power supply unit 75 are components that occupy a large accommodation space in the recording apparatus 11, the waste liquid absorbing member 50A and the power supply unit 75 are disposed separately on both sides of the discard absorbing member 70 in the recording apparatus 11, and accordingly, it is possible to optimize the entire component layout of the recording apparatus 11. Accordingly, the size of the recording apparatus 11 can be reduced.

(15) The bottom surface 71A of the accommodating section 71 that holds the discard absorbing member 70 is inclined downward toward the waste liquid absorbing member 50A. Accordingly, the waste liquid absorbed by the discard absorbing member 70 can easily flow toward the waste liquid absorbing member 50A according to the slope of the bottom surface 71A of the accommodating section 71. Therefore, compared to the configuration in which the bottom surface of the accommodating section is a horizontal surface, it becomes easier to deliver the waste liquid from the discard absorbing member 70 to the waste liquid absorbing member 50A.

(16) The waste liquid box 50B includes: the joined section 57 configured to be joined to the joining section 66 coupled to a distal end portion of the tube 64 coupled to the maintenance device 60; and the scattering prevention wall 59 provided above the distal end portion on the same side as the joined section 57. Accordingly, even when the air bubbles of the waste liquid formed at the distal end portion of the joining section 66 burst when the waste liquid box 50B is attached and detached, the scattering prevention wall 59 can prevent the burst waste liquid from scattering.

(17) In the waste liquid box 50B, the distal end of the joining section 66 joined to the joined section 57 is partially in contact with the waste liquid absorbing member 50A. Accordingly, when the waste liquid box is attached and detached, the effect of suppressing the generation of air bubbles of the waste liquid at the distal end portion of the joining section can be obtained.

(18) The recording apparatus 11 may include: the waste liquid box cover 28 that covers the waste liquid box 50B inserted into the apparatus main body 12; and the leaf spring 28B which is an example of an urging member provided between the waste liquid box 50B and the waste liquid box cover 28 and urging the waste liquid box 50B in the insertion direction when the waste liquid box cover 28 is closed.

Accordingly, it is possible to prevent half-insertion when the waste liquid box is attached and detached.

(19) The waste liquid collecting unit 50, which is inserted to be attachable to and detachable from the apparatus main body 12 of the recording apparatus 11 including the support section 26, the discharge head 25, the discard absorbing member 70, and the cap 61, includes: the waste liquid absorbing member 50A that absorbs the waste liquid sent from the cap 61; and the waste liquid box 50B that holds the waste liquid absorbing member 50A. In a state where the waste liquid box 50B is inserted into the apparatus main body 12, the waste liquid absorbing member 50A is coupled so as to absorb the waste liquid from the cap 61, and is coupled to the discard absorbing member 70 so as to deliver the waste liquid from the discard absorbing member 70. Meanwhile, when removing the waste liquid box 50B from the apparatus main body 12, coupling to the waste liquid absorbing member 50A for absorbing the waste liquid from the cap 61 is released, and coupling to the discard absorbing member 70 is disconnected in a state where the path of the waste liquid delivered from the discard absorbing member 70 is blocked. Accordingly, according to the waste liquid collecting unit 50, the effect of the above-described (1) of the recording apparatus 11 can be obtained in the same manner.

(20) The waste liquid collecting method is a method for collecting the waste liquid in the recording apparatus 11 including the support section 26, the discharge head 25, the discard absorbing member 70 that absorbs the liquid discarded to the outer side of the end portion of the medium M, and the waste liquid absorbing member 50A that absorbs the waste liquid sent from the cap 61 that receives the liquid ejected from the discharge head 25 as the waste liquid. The waste liquid box 50B is provided to be attachable to and detachable from the apparatus main body 12. In the waste liquid collecting method, when the waste liquid box 50B is inserted into the apparatus main body 12, the waste liquid absorbing member 50A is coupled to the waste liquid flow path so as to absorb the waste liquid sent from the cap 61, and is coupled to the discard absorbing member 70 so as to deliver the waste liquid from the discard absorbing member 70, and when the waste liquid box 50B is removed from the apparatus main body 12, coupling between the waste liquid absorbing member 50A and the waste liquid flow path of the cap 61 is released, and the coupling to the discard absorbing member 70 is disconnected in a state where the delivery of the waste liquid from the discard absorbing member 70 is blocked. According to the waste liquid collecting method, the same effect as the effect (1) of the recording apparatus 11 can be obtained.

Second Embodiment

Next, a second embodiment will be described with reference to FIG. 21. The configurations common to the first embodiment will be given the same reference numerals, the description thereof will be omitted, and particularly different configurations will be described. The same applies to the third and subsequent embodiments.

Figure 21:
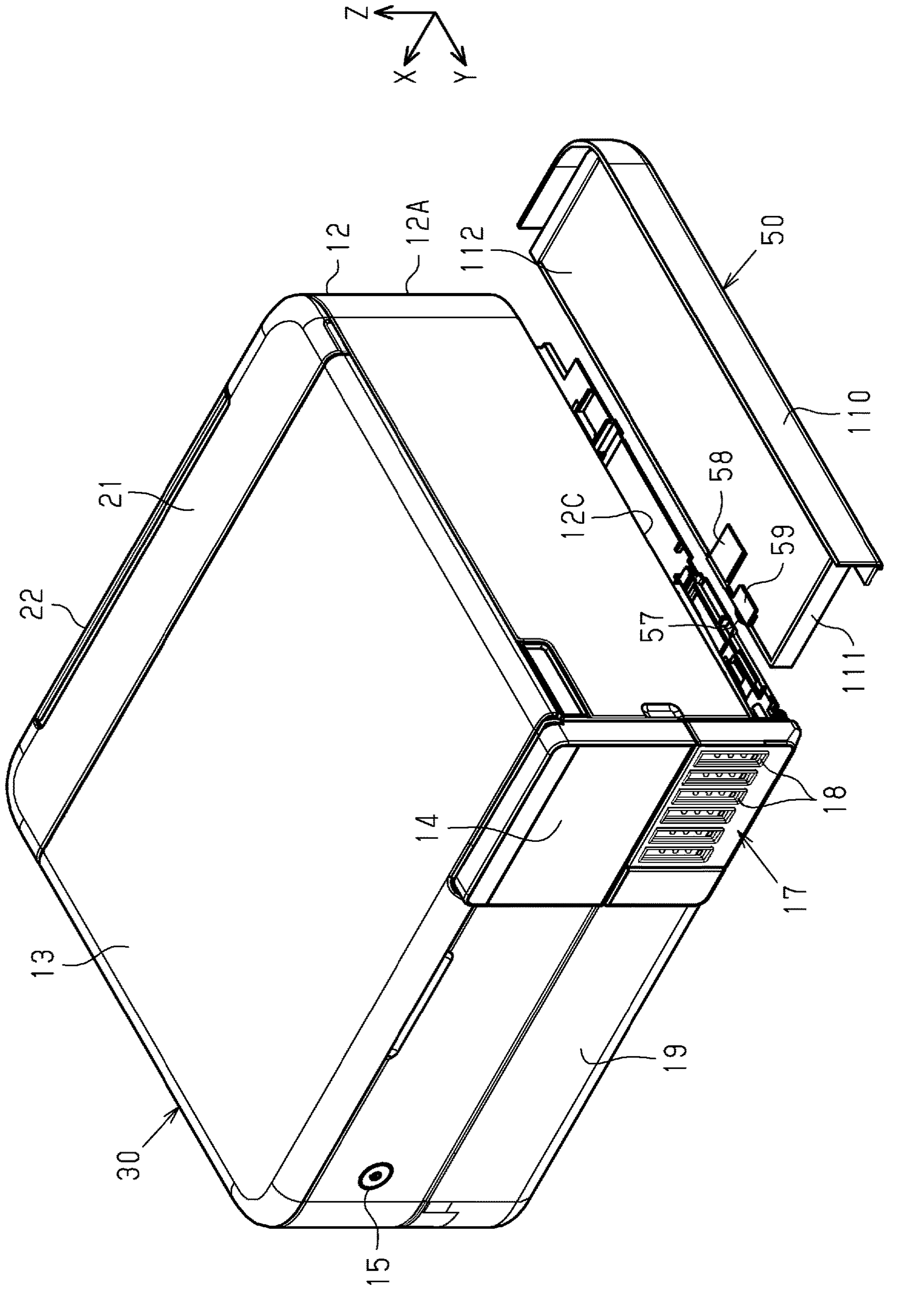
FIG. 21 is a perspective view illustrating a recording apparatus in a state where a waste liquid collecting unit is removed according to a second embodiment.

As illustrated in FIG. 21, in the recording apparatus 11 of the second embodiment, an attaching/detaching direction of the waste liquid collecting unit 50 is different from that of the first embodiment. In other words, the waste liquid collecting unit 50 may be configured to be attachable to and detachable from the side surface side of the recording apparatus 11. In other words, the insertion direction of the waste liquid collecting unit 50 into the apparatus main body 12 is a direction parallel to the width direction X.

As illustrated in FIG. 21, the waste liquid box cover 110 comes off from the right side surface of the recording apparatus 11, and the waste liquid collecting unit 50 can be moved to the right side of the recording apparatus 11. The waste liquid collecting unit 50 includes: a waste liquid absorbing member 112 which is an example of a second absorbing member; and a waste liquid box 111 which is an example of an accommodating section that holds the waste liquid absorbing member 112. The waste liquid collecting unit 50 is configured as one unit having substantially the same shape and size as those of the first waste liquid collecting section 51 in the first embodiment, and since the insertion direction thereof is the width direction X, the joined section 57, the storage element 58, and the scattering prevention wall 59 are positioned on the side portion on the distal end side in the insertion direction. The joined section 57 and the storage element 58 of the waste liquid box 111 are coupled to and separated from each other by the movement of the waste liquid collecting unit 50 in the width direction X. The waste liquid box cover 110 and the waste liquid box 111 are separate components, and have a structure that can be individually attached to and detached from the opening 12C of the apparatus main body 12. The waste liquid box cover 110 and the waste liquid box 111 may be configured to be attachable and detachable as an integral component. According to this configuration, the amount of withdrawal operation when the user takes out the waste liquid collecting unit 50 is small, and thus, the waste liquid collecting unit 50 can be easily replaced.

The waste liquid collecting unit 50 illustrated in FIG. 21 may be used as the first waste liquid collecting section 51, and may be integrally configured with the second waste liquid collecting section 52. However, since the amount of withdrawal operation of the waste liquid collecting unit 50 increases, the length of the second waste liquid collecting section 52 in the width direction X may be shorter than that of the first embodiment. The second waste liquid collecting section 52 may be provided separately and can be attached to and detached from the back surface side of the recording apparatus 11.

Third Embodiment

Figure 22:
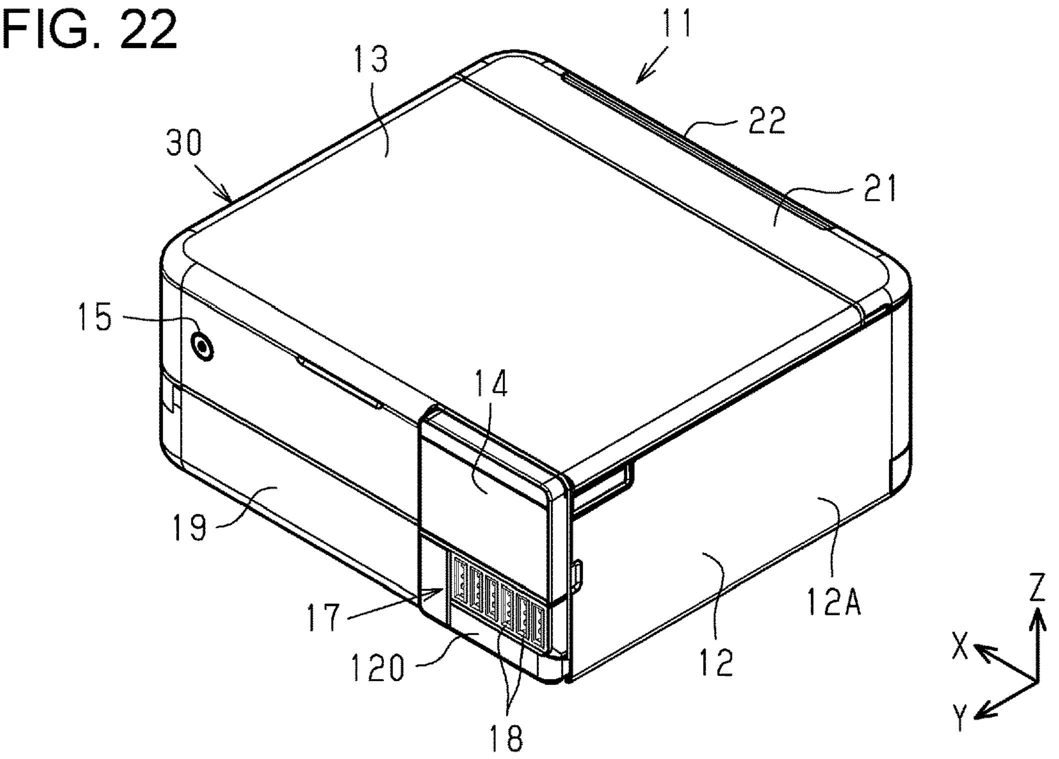
FIG. 22 is a perspective view illustrating a recording apparatus according to a third embodiment.

Next, a third embodiment will be described with reference to FIGS. 22 and 23. The waste liquid collecting unit 50 may be configured to be attachable to and detachable from the front surface side of the recording apparatus 11. As illustrated in FIG. 22, a waste liquid box cover 120 is provided on the front surface of the recording apparatus 11. In the example of FIG. 22, the waste liquid box cover 120 is positioned below the liquid supply source 17 in the apparatus main body 12. In other words, the waste liquid box cover 120 is positioned below the window section 18 indicating the liquid amount in the liquid supply source 17.

Figure 23:
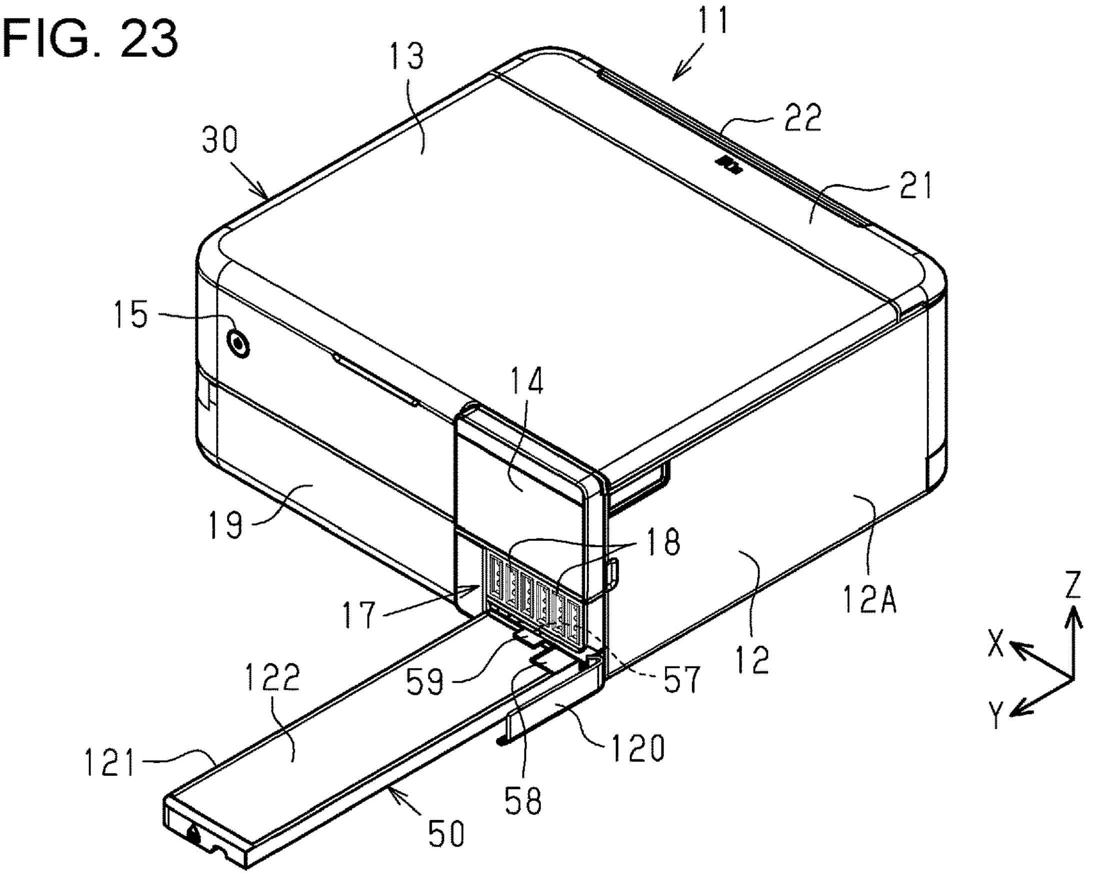
FIG. 23 is a perspective view illustrating the recording apparatus in a state where a waste liquid box is removed.

As illustrated in FIG. 23, the waste liquid box cover 120 is provided to be turnable, and the waste liquid collecting unit 50 can be moved so as to be withdrawn from the front surface of the recording apparatus 11 to the front side. In other words, the waste liquid collecting unit 50 is attachable to and detachable from the front surface of the apparatus main body 12. The insertion direction of the waste liquid box 121 is a direction toward upstream in the transport direction Y. The waste liquid collecting unit 50 includes: a waste liquid absorbing member 122 which is an example of a second absorbing member; and a waste liquid box 121 which is an example of an accommodating section that holds the waste liquid absorbing member 122. The joined section 57 and the storage element 58 of the waste liquid box 121 from the front surface of the recording apparatus 11 are coupled to and separated from each other at a rear position in the apparatus main body 12, by reciprocating the waste liquid collecting unit 50 in the front-rear direction (depth direction). In this manner, since the waste liquid collecting unit 50 is configured to be attachable to and detachable from the front surface side of the recording apparatus 11, it is easy for the user to access when taking out the waste liquid collecting unit 50.

Since the display section 14 having a touch panel function is positioned in the vicinity of the upper part of the waste liquid box cover 120, when the operation guide is displayed to the user on the display section 14 when the waste liquid collecting unit 50 is replaced, there is an advantage that the operation guide is nearby and it is easy for the user to see.

Fourth Embodiment

Figure 24:
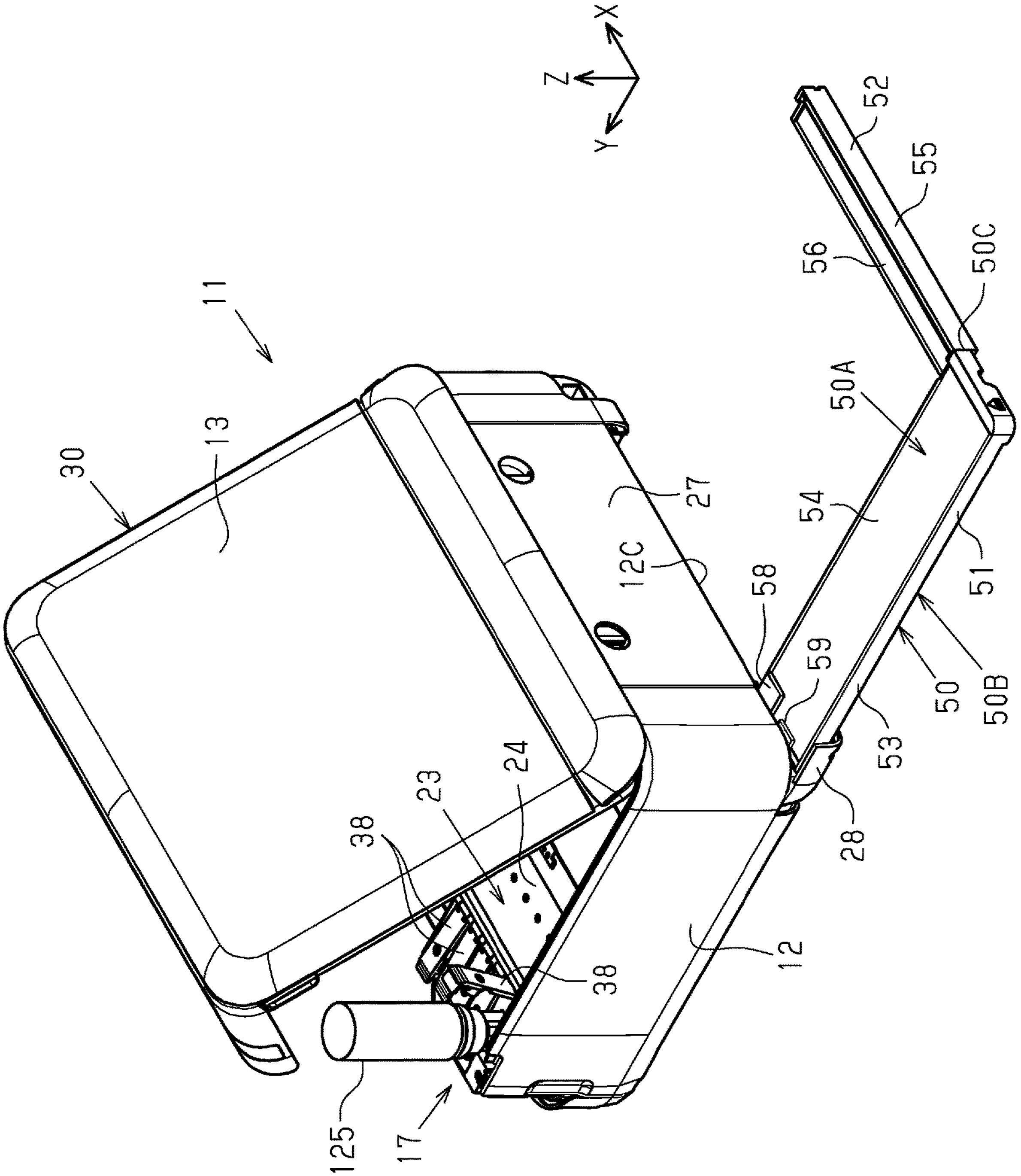
FIG. 24 is a rear perspective view illustrating a recording apparatus in a state where a waste liquid collecting unit is removed according to a fourth embodiment.

Next, a fourth embodiment will be described with reference to FIG. 24. This embodiment may be applied to the recording apparatus 11 in which the liquid supply source 17 is mounted on the upper portion of the carriage 24. As illustrated in FIG. 24, the waste liquid collecting unit 50 is configured to be attachable to and detachable from the back surface of the recording apparatus 11 as in the first embodiment. As illustrated in FIG. 24, on the upper portion of the carriage 24 of the recording section 23, the liquid supply source 17 provided with an ink tank capable of replenishing a liquid such as ink is mounted. The liquid supply source 17 individually includes the cap cover 38 that blocks the pour. When the remaining amount is low in the window section 18, the user opens the cap cover 38 and inserts a nozzle-shaped supply section of a liquid bottle 125 into the pour to replenish the liquid supply source 17 such as the ink tank with liquid such as ink. In a state where the replaceable waste liquid collecting unit 50 is inserted into the apparatus main body 12, the waste liquid absorbing member 50A is positioned below the carriage 24 at a liquid replenishment position when the user replenishes the liquid supply source 17 with a liquid. The liquid replenishment position may be the home position HP, but may be a position other than the home position HP as long as the waste liquid absorbing member 50A can be disposed below the liquid replenishment position.

According to this configuration, when replenishing the liquid supply source 17 with a liquid such as ink at the upper portion of the carriage 24, even when the waste liquid is accidentally spilled from the bottle to the replaceable waste liquid collecting unit 50 below the bottle, the waste liquid absorbing member 50A absorbs the spilled liquid. In other words, when the user accidentally spills the liquid in the operation before and after the liquid replenishment, it can be absorbed by the waste liquid absorbing member 50A of the replaceable waste liquid collecting unit 50 below the carriage 24 and the liquid supply source 17. Accordingly, it is possible to provide a more reliable recording apparatus 11 even when the liquid is spilled during liquid replenishment.

Fifth Embodiment

Figure 25:
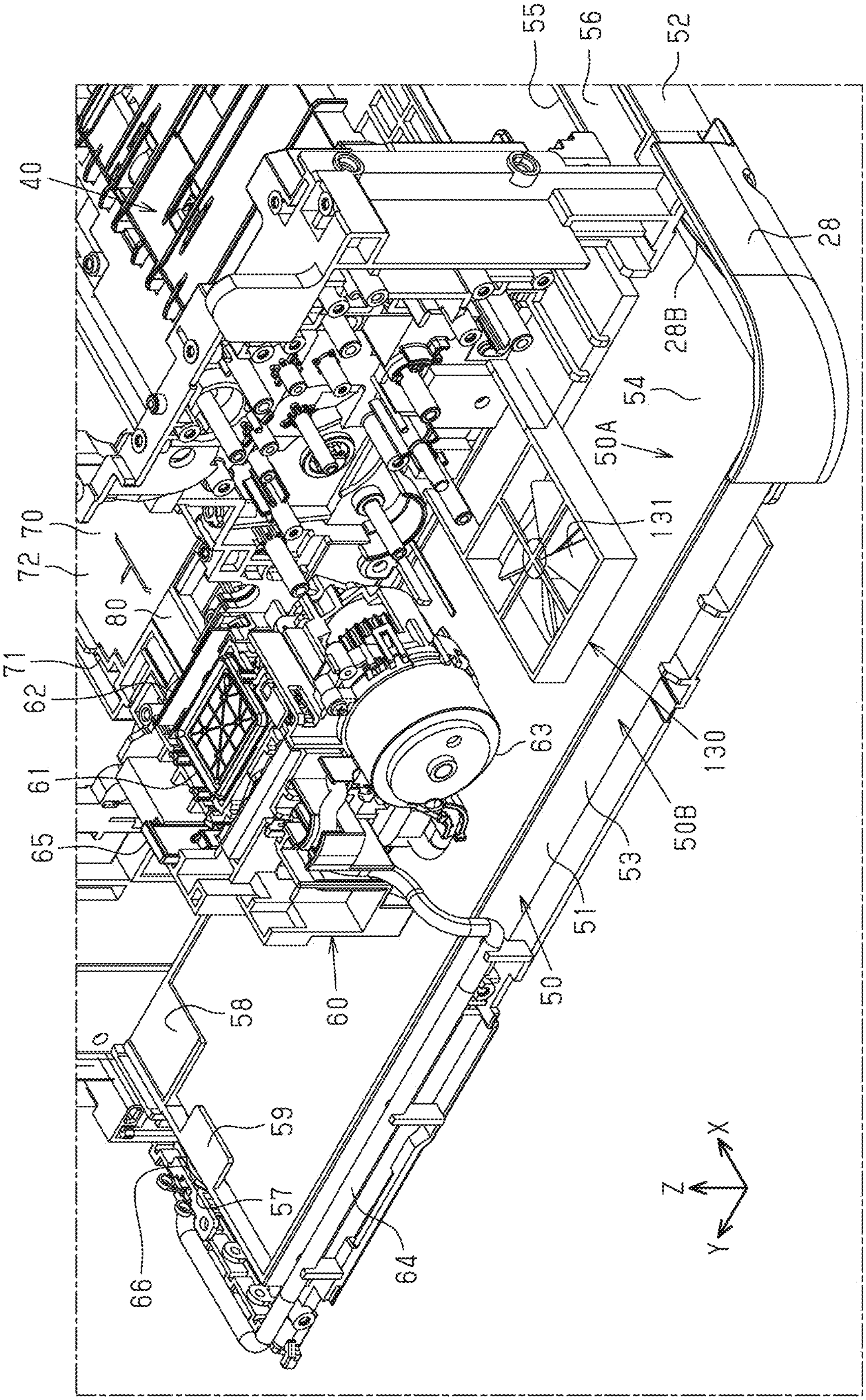
FIG. 25 is a partial perspective view illustrating a waste liquid collecting unit having a fan according to a fifth embodiment.

Next, a fifth embodiment will be described with reference to FIG. 25. As illustrated in FIG. 25, a fan unit 130 provided with a fan 131 may be provided above the replaceable waste liquid collecting unit 50. An air-cooling type fan is disposed above the waste liquid absorbing member 50A held in the waste liquid box 50B. The fan 131 is driven by, for example, the power of the maintenance device 60. The fan 131 is rotated by the power from the maintenance device 60 to send air toward the waste liquid absorbing member 50A. Since the waste liquid box 50B has an opening on the upper surface side facing the fan 131, the air sent downward from the fan 131 hits the waste liquid absorbing member 50A. When the air hits the waste liquid absorbing member 50A, drying of the waste liquid absorbed by the waste liquid absorbing member 50A is promoted. As a result, the apparent capacity of the waste liquid of the absorbing member is improved.

The drive timing of the fan 131 is synchronized with the drive of the maintenance device 60, but the fan 131 may not be driven by the power of the maintenance device 60, may be directly driven by the power of the transport motor, and may be driven by the power of the feeding motor or a dedicated power source. In this manner, the drive timing of the fan 131 may not be necessarily synchronized with the drive of the maintenance device 60. The power of the fan 131 may be generated by converting a part of the operation force of the insertion operation of the cassette 20 or the opening/closing operation of the cover by the user into the rotational force of the fan 131 without using the driving force of the motor.

Sixth Embodiment

Figure 26:
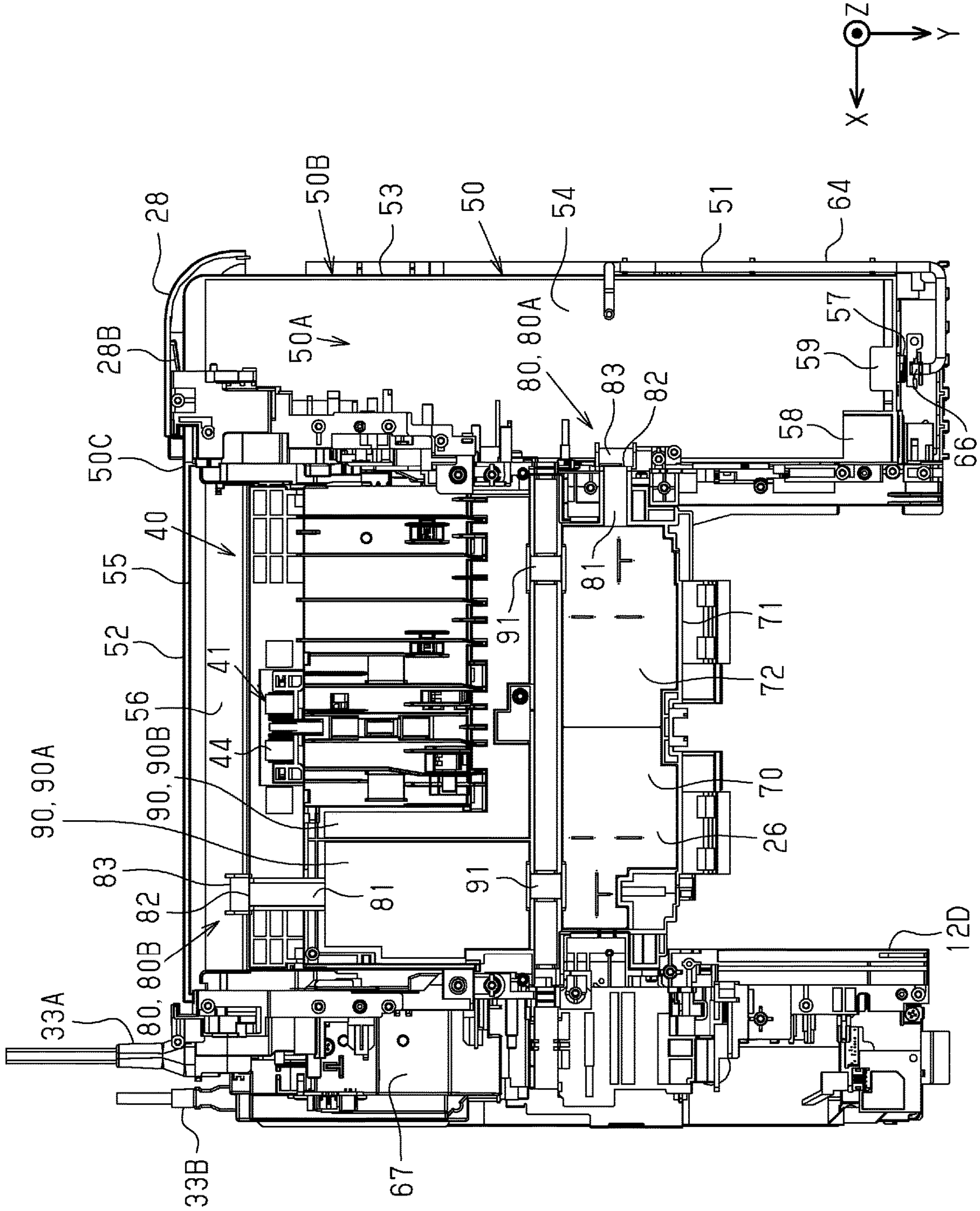
FIG. 26 is a plan view illustrating a waste liquid collecting unit including an extended absorbing member according to a sixth embodiment.

Next, a sixth embodiment will be described with reference to FIG. 26. As illustrated in FIG. 26, the discard absorbing member 70 which is an example of a first absorbing member, the delivery mechanism 80 which is an example of a delivery section, the waste liquid absorbing member 50A and the extended absorbing member 90 which are examples of a second absorbing member may form an annular path through which the liquid can be delivered.

The discard absorbing member 70 is coupled to the waste liquid absorbing member 50A to be capable of delivering the liquid via the extended absorbing member 90 at a place different from the delivery mechanism 80. In the example of FIG. 26, the recording apparatus 11 includes: a first delivery mechanism 80A that delivers the liquid from the discard absorbing member 70 to the first waste liquid absorbing member 54 of the waste liquid absorbing member 50A; and a second delivery mechanism 80B that delivers the liquid from the discard absorbing member 70 to the second waste liquid absorbing member 56 of the waste liquid absorbing member 50A via the extended absorbing member 90. The first delivery mechanism 80A corresponds to the delivery mechanism 80 of the first embodiment, and the second delivery mechanism 80B basically has the same configuration as that of the delivery mechanism 80. In other words, the second delivery mechanism 80B includes the first coupling absorbing member 81, the second coupling absorbing member 82, and the waste liquid guide section 83 (refer to also FIGS. 10 and 11).

Furthermore, the second delivery mechanism 80B may also be provided with the blocking mechanism 85. In other words, the blocking mechanism 85 may be provided to block the waste liquid delivered from the extended absorbing member 90 to the second waste liquid absorbing member 56 of the waste liquid absorbing member 50A. The blocking mechanism 85 is controlled by the control section 100, and when the waste liquid collecting unit 50 is removed, the blocking mechanism 85 is driven to be capable of blocking the waste liquid.

In the example of FIG. 26, a first path through which the waste liquid flows from the discard absorbing member 70 to the waste liquid absorbing member 50A (first waste liquid absorbing member 54) via the first delivery mechanism 80A, and a second path through which the waste liquid flows from the discard absorbing member 70 to the waste liquid absorbing member 50A (second waste liquid absorbing member 56) via the coupling absorbing member 91, the extended absorbing member 90, and the second delivery mechanism 80B, are formed. The first waste liquid absorbing member 54 and the second waste liquid absorbing member 56 are linked to each other to be capable of delivering the waste liquid via the coupling section 50C. Accordingly, in the configuration illustrated in FIG. 26, the waste liquid delivery path is formed as a loop-shaped (annular) path.

Therefore, the waste liquid of the discard absorbing member 70 is delivered to the waste liquid absorbing member 50A via the first delivery mechanism 80A, and the waste liquid delivered from the discard absorbing member 70 to the extended absorbing member 90 is delivered to the waste liquid absorbing member 50A via the second delivery mechanism 80B. Therefore, the situation in which the waste liquid is unevenly distributed and accumulated in the discard absorbing member 70 and the extended absorbing member 90, which are absorbing members other than the replaceable waste liquid absorbing member 50A, is alleviated, and the waste liquid absorption efficiency of the entire absorbing member per one recording apparatus is improved.

In FIG. 26, the first delivery mechanism 80A may be eliminated, or a third delivery mechanism having the same configuration as that of the delivery mechanism 80 may be provided between the second extended absorbing member 90B and the second waste liquid absorbing member 56. In this manner, the discard absorbing member 70 and the waste liquid absorbing member 50A may be coupled to each other at one or a plurality of points via one or a plurality of delivery sections capable of delivering the waste liquid. Then, the blocking sections may be provided in all of the plurality of delivery sections, or at least one of the delivery sections may have no blocking section.

The above-described embodiments can also be changed to a form such as the modification example illustrated below. Furthermore, a further modification example may also be an appropriate combination of the above-described embodiment and the modification examples illustrated below, or an appropriate combination of the modification examples illustrated below may be a further modification example.

- The coupling between the discard absorbing member 70 and the waste liquid absorbing member 50A is not limited to the coupling by the delivery mechanism 80, and any coupling capable of delivering the liquid is sufficient. The coupling may be, for example, "contact" in which the liquid can be delivered by the capillary phenomenon, or is included in the coupling as long as the liquid can be delivered via dripping of the liquid even in a case of being separated in a non-contact state. Furthermore, the coupling may be indirect coupling via an inclusion such as a delivery member which is an example of the delivery section other than the delivery mechanism 80, coupling via a flow path such as a groove, a recess portion, a gutter, or a tube, or the like.
- In the first and fifth embodiments, the second waste liquid collecting section 52 may be eliminated.
- In each embodiment, the blocking mechanism 85 may be eliminated. The replacement of the waste liquid collecting unit 50 is performed while the recording is stopped, and the flow rate of the waste liquid delivered from the discard absorbing member 70 to the waste liquid absorbing member 50A is often small, and thus, when the time required for replacement is short and the waste liquid does not drip during this time, the contamination of the inside of the apparatus main body 12 with the waste liquid can be suppressed.
- The first absorbing member and the second absorbing member may be positioned at the same height. For example, the bottom surface of the accommodating section that holds the first absorbing member may be an inclined surface, and the waste liquid of the first absorbing member may flow to the second absorbing member along the inclined surface by using gravity.
- The second absorbing member may be positioned higher than the first absorbing member. The waste liquid may be pumped up from the first absorbing member to the second absorbing member by using a pump. The waste liquid may be delivered to the upper position through the groove or the porous member by using the capillary phenomenon.
- The waste liquid collecting unit 50 may not include the waste liquid box 50B. For example, when the side surface and the bottom surface of the waste liquid absorbing member 50A are treated with a waterproof treatment or the like that can prevent the leakage of the waste liquid, the accommodating section such as the waste liquid box 50B that holds the waste liquid absorbing member 50A may be eliminated.
- The recording apparatus 11 is not limited to a serial printer in which the recording section 23 reciprocates in the scanning direction X, and may be a lateral type printer in which the recording section 23 can move in two directions, such as a main scanning direction and a sub-scanning direction. Furthermore, the recording apparatus 11 may be a line printer provided with a liquid discharge head, over the entire width of the medium, which is capable of simultaneously discharging a liquid from a large number of nozzles arranged at a constant nozzle pitch over the entire width of the medium having the maximum width.
- The recording apparatus 11 may not be a multifunction device on which a reading unit is mounted, but may be a printer having only a recording function among the three functions of recording, copying, and scanning.
- The medium M is not limited to a paper sheet, but may be a flexible plastic film, a cloth, a non-woven fabric, or the like, or may be a laminate having a plurality of layers of synthetic resin and metal.
- The recording apparatus 11 is not limited to the recording apparatus that performs printing on the medium such as a paper sheet, and may be a textile printing machine that performs printing on cloth.
- The liquid discharge apparatus is not limited to the printer for printing. For example, the recording apparatus may be an apparatus that manufactures pixels of various types of displays, such as electric wiring pattern, liquid crystal, electroluminescence (EL), surface emission, or the like, on a substrate which is an example of the medium by discharging a liquid material in which particles of a functional material are dispersed or mixed in a liquid. Furthermore, a liquid discharge apparatus for three-dimensional modeling may be used, in which an uncured resin liquid is discharged to form a three-dimensional object. Even in these liquid discharge apparatuses, the first absorbing member that absorbs the liquid discharged from the liquid discharge head without going through the maintenance device and the second absorbing member that absorbs the liquid ejected from the liquid discharge head by maintenance via the maintenance device may be provided, and the second absorbing member may be configured to be attachable to and detachable from the apparatus main body.

The technical idea grasped from the embodiments and the modification examples are described below together with the operation effects thereof.

(A) There is provided a liquid discharge apparatus including: a discharge head that discharges a liquid to a recording material; a support section provided facing the discharge head and supporting the recording material from below; a first absorbing member that absorbs the liquid discarded from the discharge head to an outer side of an end portion of the recording material supported by the support section, as a waste liquid; a waste liquid receiving section that receives the liquid ejected from the discharge head as a waste liquid; a second absorbing member that absorbs the waste liquid sent from the waste liquid receiving section; and an accommodating section that holds the second absorbing member, in which the first absorbing member and the second absorbing member are coupled to each other so as to deliver the waste liquid from the first absorbing member to the second absorbing member.

According to this configuration, the liquid discarded from the discharge head to the outer side of the end portion of the recording material supported by the support section is absorbed by the first absorbing member as a waste liquid. The waste liquid absorbed by the first absorbing member is delivered from the first absorbing member to the second absorbing member. It is sufficient to replace the accommodating section that holds the second absorbing member which is a part of the first absorbing member and the second absorbing member. Accordingly, it is easy to replace the absorbing member, and it is possible to suppress the contamination of the recording apparatus or the hand of the worker due to the waste liquid absorbed by the absorbing member at the time of replacement.

The coupling between the first absorbing member and the second absorbing member is sufficient as long as the coupling can deliver the liquid, may be "contact" that can deliver the liquid by the capillary phenomenon, is included in the coupling as long as only the delivery of the liquid via the dripping of the liquid is possible even in a case of being separated in the non-contact state, and includes an indirect coupling via inclusions such as a delivery member or a delivery mechanism, a coupling via a flow path such as a groove, a recess portion, a gutter, a tube and the like.

(B) In the liquid discharge apparatus, the second absorbing member may be positioned lower than the first absorbing member.

According to this configuration, the liquid can be delivered by using gravity from the first absorbing member to the second absorbing member. Accordingly, the liquid can be efficiently delivered from the first absorbing member to the second absorbing member. For example, even when the second absorbing member is replaced, it is possible to avoid a situation in which a large waste liquid amount remains in the first absorbing member and is not collected. The pump and the driving section thereof can be eliminated for the delivery of the liquid, and even when a pump or the like is provided, a small size can be achieved. Therefore, the liquid can be efficiently delivered from the discard absorbing member to the waste liquid absorbing member.

(C) In the liquid discharge apparatus, a delivery section that delivers the liquid between the first absorbing member and the second absorbing member, may further be provided.

According to this configuration, the waste liquid from the first absorbing member to the second absorbing member is delivered by the delivery section. Accordingly, even when the first absorbing member and the second absorbing member are separated from each other, the waste liquid can be delivered via the delivery section. For example, since the accommodating section that holds the second absorbing member is formed into a shape that is easily attached to or detached from the apparatus main body or is disposed at a position that is easily attached to or detached from the apparatus main body, even when the contact between the first absorbing member and the second absorbing member becomes difficult, the liquid can be delivered from the first absorbing member to the second absorbing member via the delivery section. Therefore, for example, even when the accommodating section that holds the second absorbing member is replaced, it is possible to avoid a situation in which a large liquid amount remains in the first absorbing member. In other words, it is sufficient to replace the accommodating section that holds the second absorbing member.

(D) In the liquid discharge apparatus, a blocking section configured to temporarily block delivery of the liquid by the delivery section between the first absorbing member and the second absorbing member, may further be provided.

According to this configuration, at the time of replacing the accommodating section that holds the second absorbing member, when the delivery of the liquid from the first absorbing member to the second liquid absorbing member is temporarily blocked by the blocking section, even when the second absorbing member is disconnected from the first absorbing member, it is possible to suppress the contamination of the inside of the apparatus main body with the liquid (waste liquid) delivered from the first absorbing member.

(E) In the liquid discharge apparatus, a maintenance device that forcibly ejects the liquid from the discharge head to the waste liquid receiving section, may further be provided, and the blocking section may be driven by using power of the maintenance device.

According to this configuration, since the blocking section is driven by using power of the maintenance device, it is not necessary for the user to manually switch the blocking section between blocking and coupling. For example, when the user operates the operation switch, it is possible to switch the blocking section between the blocking and coupling by using power of the maintenance device.

(F) In the liquid discharge apparatus, an extended absorbing member coupled so as to deliver the liquid to the first absorbing member, may further be provided, and the first absorbing member and the second absorbing member may be disposed facing each other with the extended absorbing member sandwiched therebetween at a position different from that of the delivery section.

According to this configuration, the waste liquid absorption accommodation amount of the entire absorbing member per one recording apparatus is increased, and thus, the replacement frequency of the second absorbing member can be reduced. In the space between the first absorbing member and the second absorbing member, a part which is not occupied by the delivery section is used, and thus, it is easy to ensure a relatively large volume for the extended absorbing member.

(G) In the liquid discharge apparatus, the delivery section may be configured to be capable of delivering a liquid in a state where the accommodating section is inserted into the apparatus main body.

According to this configuration, in a state where the accommodating section is inserted into the apparatus main body, the delivery section can deliver the liquid between the first absorbing member and the second absorbing member. Accordingly, the waste liquid absorption efficiency of the entire absorbing member can be improved.

(H) In the liquid discharge apparatus, a substrate on which electronic components are mounted, may further be provided, and the second absorbing member and the substrate may be disposed facing each other with the first absorbing member sandwiched therebetween.

According to this configuration, even when a liquid (waste liquid) such as ink leaks from the second absorbing member, it is possible to suppress application of the leaked waste liquid to the substrate. Since the liquid amount absorbed by the first absorbing member is smaller than that of the second absorbing member, it is preferable that the second absorbing member is positioned farther than the first absorbing member with respect to the substrate.

(I) In the liquid discharge apparatus, a liquid supply source that supplies the liquid to the discharge head; and a maintenance device that forcibly ejects the liquid from the discharge head to the waste liquid receiving section, may further be provided, and the second absorbing member may be disposed below the maintenance device or the liquid supply source.

According to the configuration, the waste liquid that fell downward from the maintenance device when cleaning the discharge head, or the waste liquid that fell when the liquid supply source is replaced or when the liquid is replenished to the liquid supply source, can be absorbed by the second absorbing member. Accordingly, the contamination of the waste liquid in the liquid discharge apparatus can be suppressed.

(J) In the liquid discharge apparatus, a liquid supply source that supplies the liquid to the discharge head; and a maintenance device that forcibly ejects the liquid from the discharge head to the waste liquid receiving section, may further be provided, and the second absorbing member may have a function of absorbing the liquid scattered from the maintenance device or the liquid supply source.

According to this configuration, the liquid scattered from the maintenance device or the liquid supply source can be absorbed by the second absorbing member. Accordingly, the contamination of the waste liquid in the liquid discharge apparatus can be suppressed.

(K) In the liquid discharge apparatus, a cassette that accommodates the recording material at a position below the discharge head; and a first feeding section that feeds the recording materials accommodated in the cassette one by one toward a recording position of the discharge head, may further be provided, and the second absorbing member may be disposed so as to partially overlap below the first feeding section.

According to this configuration, the size of the liquid discharge apparatus can be reduced.

(L) In the liquid discharge apparatus, a second feeding section that feeds the recording material toward a recording position of the discharge head without passing through a reversing section, may further be provided, and the second absorbing member may be disposed so as to overlap below the second feeding section.

According to this configuration, the size of the liquid discharge apparatus can be reduced.

(M) In the liquid discharge apparatus, a reversing section that switches back and transports the recording material on which recording of a first surface is finished by the discharge head to an upstream in a transport direction, and reverses the recording material such that a second surface, which is a surface opposite to the first surface, faces the discharge head, may further be provided, and the second absorbing member may be disposed so as to partially overlap below the reversing section.

According to this configuration, the size of the liquid discharge apparatus can be reduced.

(N) In the liquid discharge apparatus, a power supply unit that supplies electric power to the discharge head, may further be provided, and the second absorbing member and the power supply unit may be disposed facing each other with the first absorbing member sandwiched therebetween.

According to this configuration, since the second absorbing member and the power supply unit are components that occupy a large accommodation space in the recording apparatus, the second absorbing member and the power supply unit are disposed across both sides with the first absorbing member sandwiched therebetween in the recording apparatus, and accordingly, it is possible to optimize the component layout of the entire recording apparatus. Accordingly, the size of the recording apparatus can be reduced.

(O) In the liquid discharge apparatus, a bottom surface of an accommodating section that holds the first absorbing member may be inclined downward toward the second absorbing member.

According to this configuration, the waste liquid absorbed by the first absorbing member can be easily flowed toward the second absorbing member by the slope of the bottom surface of the accommodating section. Accordingly, compared to the configuration in which the bottom surface of the accommodating section is a horizontal surface, it becomes easier to deliver the waste liquid from the first absorbing member to the second absorbing member.

(P) In the liquid discharge apparatus, the accommodating section that accommodates the second absorbing member may include a joined section configured to be joined to a joining section coupled to a distal end portion of a tube coupled to the maintenance device, and a scattering prevention wall provided above the distal end portion on the same side as the joined section.

According to this configuration, even when the air bubbles of the waste liquid formed at the distal end portion of the needle-shaped joining section burst when the waste liquid box is attached and detached, the scattering prevention wall can prevent the burst waste liquid from scattering.

(Q) In the liquid discharge apparatus, a distal end of the joining section joined to the joined section may be partially in contact with the second absorbing member.

According to this configuration, when the waste liquid box is attached and detached, the effect of suppressing the generation of air bubbles of the waste liquid at the distal end portion of the joining section can be obtained.

(R) In the liquid discharge apparatus, a cover that covers the accommodating section inserted into the apparatus main body, and an urging member provided between the accommodating section and the cover and urging the accommodating section in an insertion direction when the cover is closed, may further be provided.

According to this configuration, it is possible to prevent half-insertion when the waste liquid box is attached and detached.

(S) There is provided a waste liquid collecting unit which is inserted to be attachable to and detachable from an apparatus main body of a liquid discharge apparatus including a support section that supports a recording material, a discharge head that discharges a liquid to the recording material, a first absorbing member that absorbs the liquid discarded from the discharge head to an outer side of an end portion of the recording material supported by the support section, and a waste liquid receiving section that receives the liquid ejected from the discharge head as a waste liquid, the waste liquid collecting unit including: a second absorbing member that absorbs a waste liquid sent from the waste liquid receiving section; and an accommodating section that holds the second absorbing member, in which, in a state where the accommodating section is inserted into the apparatus main body, the second absorbing member is coupled so as to absorb the waste liquid from the waste liquid receiving section, and is coupled to the first absorbing member so as to deliver the waste liquid from the first absorbing member, and when the accommodating section is removed from the apparatus main body, coupling between the second absorbing member and the second absorbing member for absorbing the waste liquid from the waste liquid receiving section is released, and coupling between the second absorbing member and the first absorbing member is disconnected in a state where a path of the waste liquid delivered from the first absorbing member is blocked. According to this configuration, the same effect as that of the liquid discharge apparatus can be obtained.

(T) There is provided a waste liquid collecting method for collecting a waste liquid in a liquid discharge apparatus including a support section that supports a recording material, a discharge head that discharges a liquid to the recording material, a first absorbing member that absorbs the liquid discarded from the discharge head to an outer side of an end portion of the recording material supported by the support section, a second absorbing member that absorbs the waste liquid sent from a waste liquid receiving section that receives the liquid ejected from the discharge head as a waste liquid, and an accommodating section that holds the second absorbing member, the method including: providing the accommodating section to be attachable to and detachable from an apparatus main body; coupling the second absorbing member to a waste liquid flow path so as to absorb the waste liquid sent from the waste liquid receiving section, and coupling the second absorbing member to the first absorbing member so as to deliver the waste liquid from the first absorbing member, when the accommodating section is inserted into the apparatus main body; and releasing the coupling between the second absorbing member and the waste liquid flow path of the waste liquid receiving section, and disconnecting the coupling between the second absorbing member and the first absorbing member in a state where the delivery of the waste liquid from the first absorbing member is blocked, when the accommodating section is removed from the apparatus main body. According to this method, the same effect as that of the liquid discharge apparatus can be obtained.

What is claimed is:

1. A liquid discharge apparatus comprising:

a discharge head that discharges a liquid to a recording material that is moved in a transport direction;

a support section provided facing the discharge head and supporting the recording material from below;

a first absorbing member that absorbs the liquid discarded from the discharge head to an outer side of an end portion of the recording material supported by the support section, as a waste liquid;

a waste liquid receiving section that receives the liquid ejected from the discharge head as a waste liquid;

a second absorbing member that absorbs the waste liquid sent from the waste liquid receiving section; and a waste liquid box that holds the second absorbing member, the waste liquid box comprising an elongate first waste liquid collecting section that extends in the transport direction and holds a first waste liquid absorbing member of the second absorbing member and an elongate second waste liquid collecting section coupled to an upstream end of the first waste liquid collecting section, that extends in a width direction of the liquid discharge apparatus, and holds a second waste liquid absorbing member of the second absorbing member, the first waste liquid collecting section and the second waste liquid collecting section form the waste liquid box into an L-shape in plan view;

a delivery section that delivers the liquid between the first absorbing member and the second absorbing member;

a blocking section configured to temporarily block delivery of the liquid from the delivery section between the first absorbing member and the second absorbing member;

a maintenance device that forcibly ejects the liquid from the discharge head to the waste liquid receiving section, wherein the first absorbing member and the second absorbing member are coupled to each other so as to deliver the waste liquid from the first absorbing member to the second absorbing member, wherein the blocking section is driven by using power of the maintenance device.

2. The liquid discharge apparatus according to claim 1, wherein the second absorbing member is positioned lower than the first absorbing member.

3. The liquid discharge apparatus according to claim 1, further comprising:

an extended absorbing member coupled so as to deliver the liquid to the first absorbing member, wherein the first absorbing member and the second absorbing member are disposed facing each other in relation to a transport direction of the recording medium with the extended absorbing member sandwiched therebetween in the transport direction at a position different from that of the delivery section.

4. The liquid discharge apparatus according to claim 1, wherein the delivery section is configured to deliver the liquid in a state where the waste liquid box is inserted into the apparatus main body.

5. The liquid discharge apparatus according to claim 1, further comprising:

a substrate on which electronic components are mounted, wherein the second absorbing member and the substrate are disposed facing each other in a scanning direction of the discharge head with the first absorbing member disposed between the substrate and the second absorbing member in the scanning direction.

6. The liquid discharge apparatus according to claim 1, further comprising:

a liquid supply source that supplies the liquid to the discharge head; and a maintenance device that forcibly ejects the liquid from the discharge head to the waste liquid receiving section, wherein the second absorbing member is disposed below the maintenance device or the liquid supply source.

7. The liquid discharge apparatus according to claim 1, further comprising:

a liquid supply source that supplies the liquid to the discharge head; and a maintenance device that forcibly ejects the liquid from the discharge head to the waste liquid receiving section, wherein the second absorbing member has a function of absorbing the liquid scattered from the maintenance device or the liquid supply source.

8. The liquid discharge apparatus according to claim 1, further comprising:

a cassette that accommodates the recording material at a position below the discharge head; and a first feeding section that feeds the recording materials accommodated in the cassette one by one toward a recording position of the discharge head, wherein the second absorbing member is disposed so as to partially overlap below the first feeding section.

9. The liquid discharge apparatus according to claim 1, further comprising:

a second feeding section that feeds the recording material toward a recording position of the discharge head without passing through a reversing section, wherein the second absorbing member is disposed so as to overlap below the second feeding section.

10. The liquid discharge apparatus according to claim 1, further comprising:

a reversing section that switches back and transports the recording material on which recording of a first surface is finished by the discharge head to an upstream in a transport direction, and reverses the recording material such that a second surface, which is a surface opposite to the first surface, faces the discharge head, wherein the second absorbing member is disposed so as to partially overlap below the reversing section.

11. The liquid discharge apparatus according to claim 1, further comprising:

a power supply unit that supplies electric power to the discharge head, wherein the second absorbing member and the power supply unit are disposed facing each other in the scanning direction with the first absorbing member disposed between the power supply unit and the second absorbing member in a scanning direction.

12. The liquid discharge apparatus according to claim 1, wherein a bottom surface of an accommodating member that holds the first absorbing member is inclined downward toward the second absorbing member.

13. The liquid discharge apparatus according to claim 1, wherein the waste liquid box includes a joined section configured to be joined to a joining section coupled to a distal end portion of a tube coupled to the maintenance device, and a scattering prevention wall provided above the distal end portion on the same side as the joined section.

14. The liquid discharge apparatus according to claim 13, wherein a distal end of the joining section joined to the joined section is partially in contact with the second absorbing member.

15. The liquid discharge apparatus according to claim 1, further comprising:

a cover that covers the waste liquid box inserted into the apparatus main body; and an urging member provided between the waste liquid box and the cover and urging the waste liquid box in an insertion direction when the cover is closed.

* * * * *